United States Patent
Isono et al.

(10) Patent No.: US 7,489,994 B2
(45) Date of Patent: Feb. 10, 2009

(54) CONTROL SYSTEM FOR MOVABLE BODY

(75) Inventors: Hiroshi Isono, Toyota (JP); Yasuji Mizutani, Susono (JP); Koichi Takeuchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 375 days.

(21) Appl. No.: 11/061,880

(22) Filed: Feb. 22, 2005

(65) Prior Publication Data
US 2005/0222724 A1 Oct. 6, 2005

(30) Foreign Application Priority Data
Mar. 31, 2004 (JP) .............................. 2004-103650

(51) Int. Cl.
*G06F 7/00* (2006.01)
(52) U.S. Cl. ........................................ 701/36; 340/438
(58) Field of Classification Search .................. 701/36, 701/33, 29, 35, 301; 340/438, 439, 436, 340/945, 961, 963; 434/62, 64, 65
See application file for complete search history.

(56) References Cited

U.S. PATENT DOCUMENTS 5,902,345 A * 5/1999 Minowa et al. ............... 701/96
6,253,129 B1 * 6/2001 Jenkins et al. ................ 701/29
6,487,475 B1 * 11/2002 Yoshikawa ..................... 701/1
6,714,894 B1 * 3/2004 Tobey et al. ................ 702/188
6,853,902 B2 * 2/2005 Miller et al. ................. 701/82
6,940,426 B1 * 9/2005 Vaida .......................... 340/963

FOREIGN PATENT DOCUMENTS

| JP | A 07-036727 | 2/1995 |
| JP | A 09-091034 | 4/1997 |
| JP | A 11-039586 | 2/1999 |
| JP | A 2001-071873 | 3/2001 |
| JP | A 2002-175597 | 6/2002 |
| JP | A 2003-067580 | 3/2003 |

* cited by examiner

*Primary Examiner*—Dalena Tran
(74) *Attorney, Agent, or Firm*—Oliff & Berridge, PLC

(57) ABSTRACT

A control system includes a risk management control unit, an input unit, an execution system unit, and an evaluation unit. The evaluation unit detects gain in line with expected target characteristic and risk contrary to the target characteristic as a result of control. The detected gain and risk are processed in the probability dimension, and histograms indicating occurrence probabilities are generated. By grasping the gain and risk in the probability dimension as the system reliability, the risk management control unit determines the risk and decides a cyclic, growth process. The risk management control unit carries out risk management by detecting a sign of abnormality or the like, based on the system reliability with the gain and risk detected by the evaluation unit being taken in the probability dimension.

32 Claims, 18 Drawing Sheets

F I G. 8
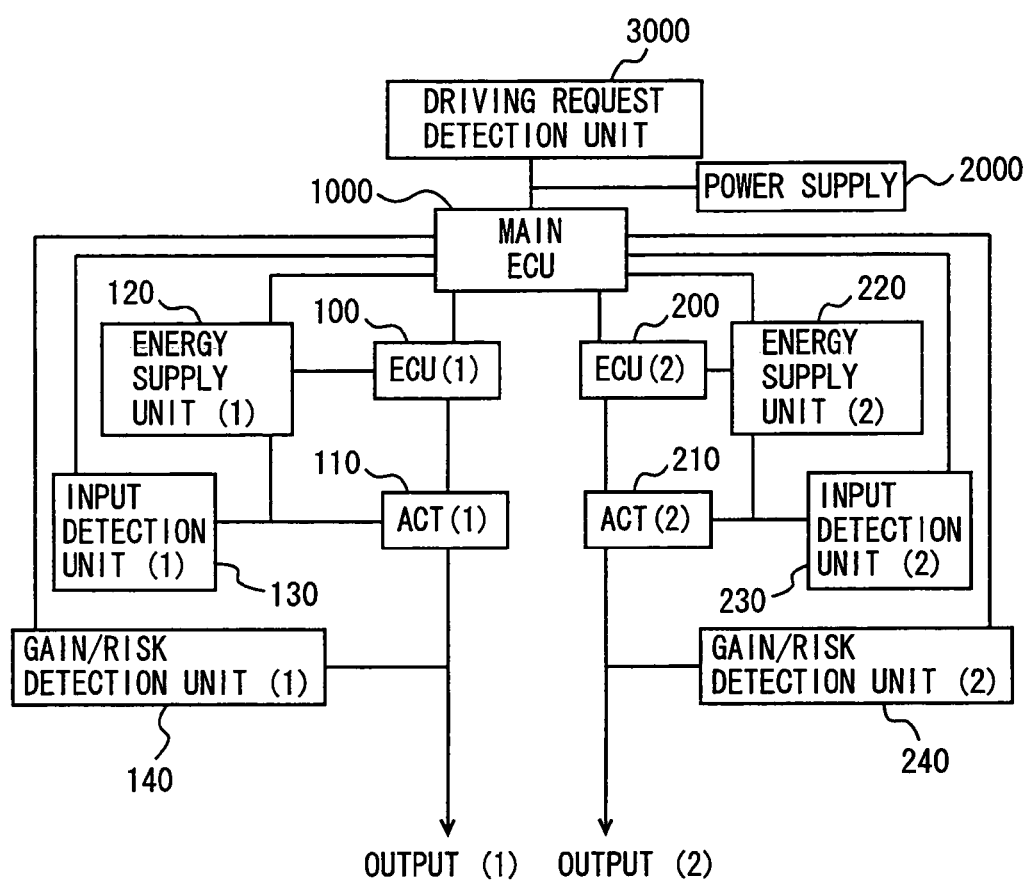

F I G. 1 3
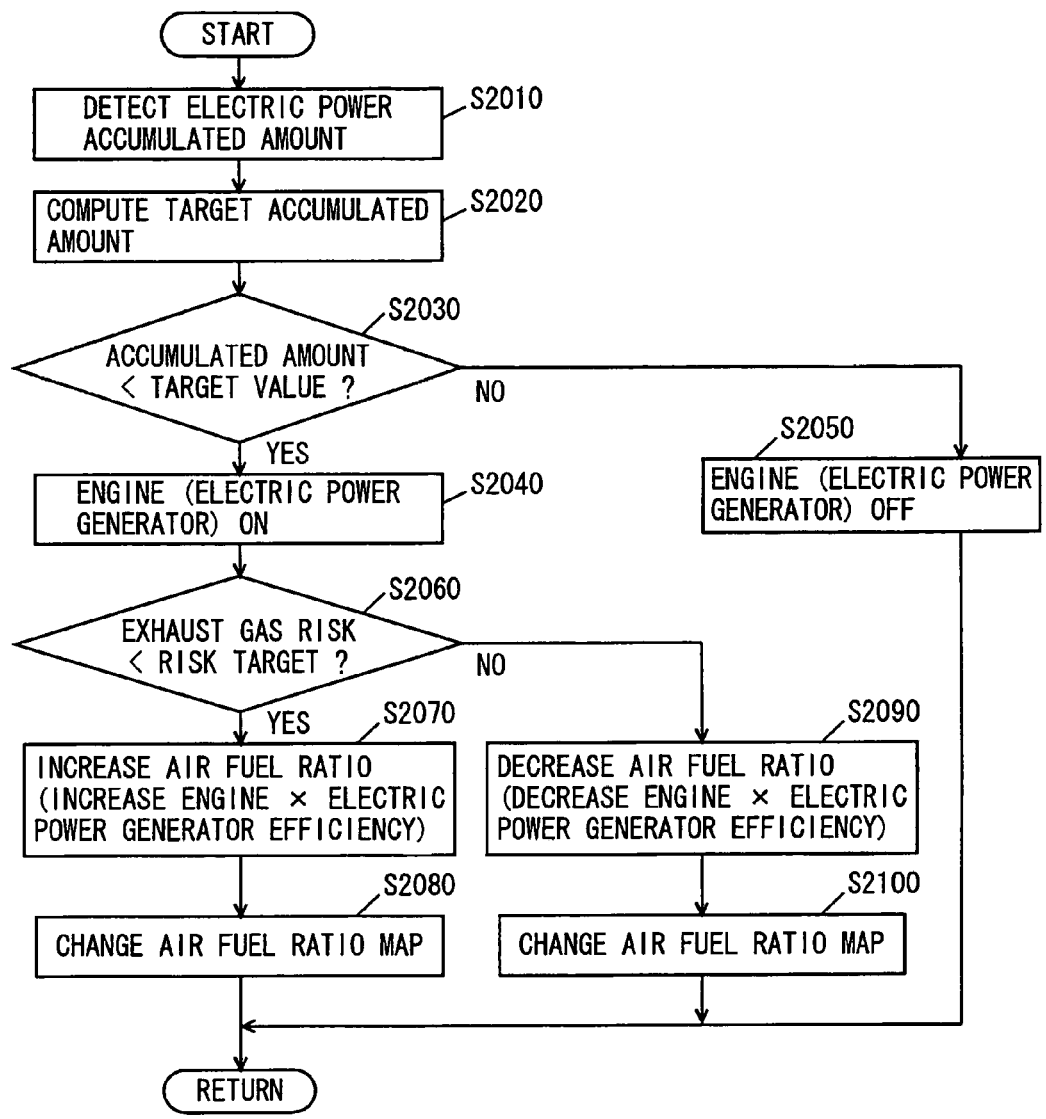

F I G. 2 0
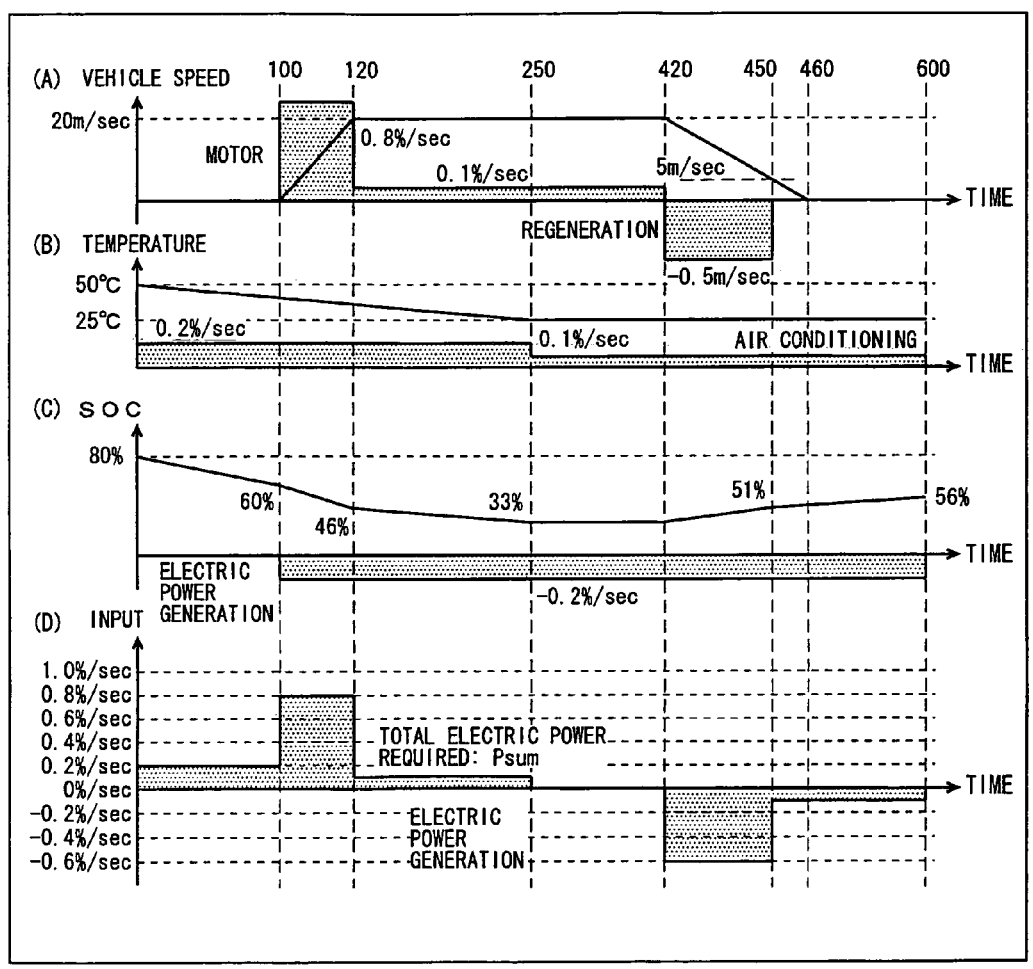

CONTROL SYSTEM FOR MOVABLE BODY

This nonprovisional application is based on Japanese Patent Application No. 2004-103650 filed with the Japan Patent Office on Mar. 31, 2004, the entire contents of which are hereby incorporated by reference.

BACKGROUND OF THE INVENTION

1. Field of the Invention

The present invention relates to a system for control of the state of an object of control to meet the target in a computer system applied to a movable body, and more particularly to a control system that sets a higher control target or improves reliability and hence stability of the system taking account of gain and risk that would occur along with execution of the control.

2. Description of the Background Art

In the field of movable bodies that move autonomously, including vehicles such as automobiles, there has been a continuous demand for improvement in control performance of vehicle control systems, along with tightened environmental regulations, increased demands for better fuel efficiency and the like. With the vehicle control systems highly computerized, a great number of electronic control units (ECUs) incorporated in a vehicle execute software to control the vehicle. Recently, in addition to the fundamental functions of the vehicle to "run, turn and stop", additional functions with provision of control systems of transmission and engine connected to a navigation device, and driving assist systems for auto cruise, lane keep and others, have been realized by software executed by the ECUs dedicated to the respective functions.

In the control system as described above, reliability is ensured only when there is no error in data input to the ECUs and in operations by the software within the ECUs. Japanese Patent Laying-Open No. 11-039586 (Document 1) discloses an automatic driving control device concerning this issue. The automatic driving control device communicates data between a plurality of electronic control devices, and controls the automatic driving of the vehicle by means of the plurality of electronic control devices. When data received from the sender-side electronic control device is continuous data indicating the running state of the vehicle in time series, it is determined that abnormality has occurred when a change in the received continuous data is out of a predetermined feasible range.

With this automatic driving control device, it is possible to check reliability of the data upon automatic driving of the vehicle, to control the vehicle as appropriate.

In Document 1, reliability of the data is determined in the following manner. Firstly, in the case where a difference between two continuous pieces of data of current vehicle speed is out of a physically possible range (e.g., ±3 km/h), it is temporarily determined that data is abnormal. When it is determined as abnormal continuously for longer than 0.5 seconds since the first temporary abnormality judgment, it is determined that abnormality has surely occurred related to continuity of data. As such, particular values for range and time are employed as threshold values, which are compared with actual values to determine presence/absence of abnormality.

In the conventional control system according to the above-described technique, it is determined as abnormal when deviation from a target value for control exceeds a predetermined threshold value. This means that a measure against abnormality can be conducted only after the deviation actually exceeds the threshold value. For example, when the deviation exceeds the threshold value, it is checked whether the input sensor of the control system is abnormal, or it is checked whether there is an error in an operational expression from the intermediate result of operation, and modification is made so as to realize a target control value (in a simplified manner, for example). These measures, however, cannot be conducted until the deviation exceeds the threshold value, which means that it is difficult to predict the abnormality to address the same.

In this regard, if not restricted to the control system, a variety of management methods such as risk management and others have been proposed. For example, a risk hedge system estimates profit (gain) to be obtained in the future, taking business risk into consideration. One of such systems handles occurrence of risk with a probability theory, and obtains an optimal solution for business expansion to increase the profit (gain) while avoiding risk (risk hedge).

In the control system involving vehicle control, it is considered that application of the above-described processing is difficult, due to the following reasons:

1) that gain and risk are not subject to management in the same dimension on the control system; and 2) that since risk is not taken into consideration, stopping the control system would be the only conceivable measure to address the occurrence of risk.

Accordingly, it is difficult to realize risk management in the control system that can obtain largest possible gain (improved fuel efficiency, optimized exhaust gas purification) while preventing risk from occurring.

SUMMARY OF THE INVENTION

The present invention has been made to solve the above-described problems. An object of the present invention is to provide a control system that can set a higher control target or improve reliability of the system for stabilization thereof, taking account of gain and risk that would occur along with execution of control.

According to an aspect of the present invention, a control system is for controlling a movable body, and includes a detection unit that detects at least one of information related to state quantity and information related to operation quantity, a control unit that generates control information to be applied to an execution unit for achieving a target based on the detected information, and the execution unit that executes at least one of an electrical operation and a mechanical operation based on the control information. The control system also includes a reliability detection unit that detects information related to reliability of the system, by processing, for the system, at least state quantity in line with the target and state quantity contrary to the target in a same dimension allowing comparison therebetween, and a modification unit that modifies at least one of the target and the control information based on the detected information related to reliability.

In accordance with this invention, reliability of the system can be grasped e.g. in a probability dimension where state quantity in line with a target and state quantity contrary to the target can be compared, and the modification unit can modify at least one of the target and the control information based on the probability (possibility) of occurrence of abnormality. With this configuration, it is possible to process the state quantity in line with the target (which is called "gain") and the state quantity contrary to the target (which is called "risk") in the same dimension. If the dimension is a probability dimension, for example, a sign of abnormality present in the vicinity of the boundary between normality and abnormality can be detected, which would not be detected with the conventional processing using threshold values. Regarding this as the risk that may occur, the risk as well as the gain as a result of control may be taken into consideration to enable growth of the control system. Specifically, if the possibility of occurrence of risk is small in terms of probability, the control target may be changed to a higher level. As a result, it is possible to provide a control system that can set a higher control target or improve reliability and hence stability of the system, taking account of gain and risk that would occur in connection with execution of the control.

Preferably, the reliability detection unit detects the information related to reliability of the system by processing in a probability dimension.

In accordance with this invention, the information related to reliability is processed in the probability dimension, which makes it possible to detect a sign of abnormality in the vicinity of the boundary between normality and abnormality, unlike the conventional case where processing is conducted using threshold values. This may be regarded as the risk that may occur, and this risk as well as the gain as a result of control can be taken into consideration to enable growth of the control system.

Still preferably, the reliability detection unit detects the information related to reliability based on the probability that deviation from the target in the execution unit is not less than a predetermined value.

In accordance with this invention, it can be determined that reliability is low (i.e., risk is high) when there is a high probability of occurrence of the state where the deviation from the target is large.

Still preferably, the reliability detection unit detects the information related to reliability based on the probability that, as a result of execution of the operation by the execution unit, deviation of an actual output from an intended output corresponding to the target is not less than a predetermined value.

In accordance with this invention, it is possible to determine that reliability is high (i.e., risk is low) or reliability is low (i.e., risk is high) by obtaining probability distribution of the deviation of the actual output from the target output.

Still preferably, the reliability detection unit detects the information related to reliability based on the probability that, as a result of execution of the operation by the execution unit, deviation of actual efficiency from intended efficiency corresponding to the target is not less than a predetermined value.

In accordance with this invention, it is possible to determine that reliability is high (i.e., risk is low) or reliability is low (i.e., risk is high) by obtaining probability distribution of the deviation of the actual efficiency from the target efficiency.

Still preferably, the information related to reliability is information represented by a probability that state quantity of a component constituting the movable body changes.

In accordance with this invention, when the movable body is e.g. a vehicle, and assuming that the component is an engine, the information related to reliability can be generated by detecting how the state quantities such as an output, heat efficiency and others of the engine have actually changed with respect to the target or reference characteristics as a result of the control, and by obtaining probability distribution of the deviation of the actual values from the target or reference values.

Still preferably, the information related to reliability is information represented by the probability of occurrence of abnormality in at least one of an input-related component, a control-related component, an output-related component, and a communication-related component, constituting the movable body.

Abnormality in any of the key components of the control system, including the input-related component, the control-related component, the output-related component and the communication-related component, will considerably affect reliability of the control system. Thus, in accordance with this invention, the information related to reliability is generated based on the abnormality in any of those components, so that it is possible to obtain meaningful information about reliability.

Still preferably, the information related to reliability is information represented by the probability of occurrence of abnormality attributable to at least one of a detection error of a sensor detecting the state quantity as an input-related component, an operation error of an actuator as an output-related component, response of an actuator as the output-related component, response of a communication-related component, and an error of the target, the components constituting the movable body.

In accordance with this invention, the information related to reliability is generated according to the probability of occurrence of abnormality in the form of a detection error of the sensor, an operation error or response of the actuator, response of the communication-related component, or an error of the target. Therefore, meaningful information about reliability can be obtained.

Still preferably, the modification unit modifies at least one of the target and the control information based on deviation from the target when the reliability is within a target range.

In accordance with this invention, it is possible, based on the deviation from the target grasped in the probability dimension, to modify the target when the deviation is too large to converge, determining that the target is excessive, or to modify the control information when the deviation is small, by changing input/output characteristics of the actuator or the like to allow control with higher degree of accuracy.

Still preferably, the modification unit modifies the control information, when the deviation from the target is within a predetermined range, by changing input/output characteristics for generating the control information.

In accordance with this invention, when the deviation from the target grasped in the probability dimension is small, the control information can be modified by changing the input/output characteristics of the actuator or the like to allow control with higher degree of accuracy.

Still preferably, the modification unit modifies the target, when the deviation from the target is equal to or greater than a predetermined value, determining that the target is too high.

In accordance with this invention, it is possible to change the target, based on the deviation from the target grasped in the probability dimension, when the deviation is too large to converge, determining that the target is too high. This improves reliability of the control system.

According to another aspect of the present invention, a control system controls a vehicle as a movable body to realize a required target in the vehicle. The control system includes a detection unit that detects state quantity of the vehicle in line with target characteristic as gain state quantity, a detection unit that detects state quantity of the vehicle contrary to the target characteristic as risk state quantity, a calculation unit that calculates a probability of occurrence of deviation of each of the detected state quantities from a corresponding target, and a modification unit that modifies the target in a direction leading to further improvement of performance when the probability calculated for the risk state quantity is within a predetermined range and the probability calculated for the gain state quantity is within a predetermined range.

In accordance with this invention, the state quantity of the vehicle in line with the target characteristic is detected as the gain state quantity, while the state quantity of the vehicle contrary to the target characteristic is detected as the risk state quantity. That is, as a result of certain control, the gain information in conformity with the expected target characteristic and the risk information contrary to the target characteristic are detected, and processed in the probability dimension. When the risk is low, the target can be changed in a direction to further improve the performance, making it possible to execute control of higher performance.

According to a further aspect of the present invention, a control system controls a vehicle as a movable body to realize a required target in the vehicle. The control system includes a detection unit that detects state quantity of the vehicle in line with target characteristic as gain state quantity, a detection unit that detects state quantity of the vehicle contrary to the target characteristic as risk state quantity, a calculation unit that calculates a probability of occurrence of deviation of each of the detected state quantities from a corresponding target, and a modification unit that modifies input/output characteristics of an actuator related to the gain state quantity in the case where the probability calculated for the risk state quantity is within a predetermined range and the probability calculated for the gain state quantity is out of a predetermined range.

In accordance with this invention, the state quantity of the vehicle in line with the target characteristic is detected as the gain state quantity, while the state quantity of the vehicle contrary to the target characteristic is detected as the risk state quantity. That is, as a result of certain control, the gain information in conformity with the expected target characteristic and the risk information contrary to the target characteristic are detected, and processed in the probability dimension. In the case where the risk is low but the gain is low as well, the input/output characteristics of the actuator related to the gain state quantity can be changed to improve controllability.

According to yet another aspect of the present invention, a control system controls a vehicle as a movable body to realize a required target in the vehicle. The control system includes a detection unit that detects state quantity of the vehicle in line with target characteristic as gain state quantity, a detection unit that detects state quantity of the vehicle contrary to the target characteristic as risk state quantity, a calculation unit that calculates a probability of occurrence of deviation of each of the detected state quantities from a corresponding target, and an execution unit that executes a risk aversion process when the probability calculated for the risk state quantity is out of a predetermined range.

In accordance with this invention, the state quantity of the vehicle in line with the target characteristic is detected as the gain state quantity, while the state quantity of the vehicle contrary to the target characteristic is detected as the risk state quantity. That is, as a result of certain control, the gain information in conformity with the expected target characteristic and the risk information contrary to the target characteristic are detected, and they are processed in the probability dimension. High risk means that abnormality is likely to occur or has actually occurred, and thus, the risk aversion process is conducted immediately, to secure stability of the control system.

According to yet another aspect of the present invention, a control system controls at least one of energy efficiency, driving performance, exhaust gas performance, and braking performance, in a vehicle as a movable body. The control system includes a detection unit that detects, as gain state quantity, at least one of vehicle speed, driving efficiency, exhaust gas purification performance, braking force and braking efficiency, a detection unit that detects, as risk state quantity, at least one of risk of reduction of the vehicle speed, risk of reduction of the driving efficiency, risk of degradation of the exhaust gas purification performance, risk of reduction of the braking force, and risk of reduction of the braking efficiency, a calculation unit that calculates a probability of occurrence of deviation of each of the detected state quantities from a corresponding target, and a modification unit that modifies the target in a direction leading to further improvement of performance when the probability calculated for the risk state quantity is within a predetermined range and the probability calculated for the gain state quantity is within a predetermined range.

In accordance with this invention, it is possible, based on the specific gain and risk of the vehicle, to change the target in a direction to further improve the performance when the risk is low. This enables control of higher performance.

According to yet another aspect of the present invention, a control system controls at least one of energy efficiency, driving performance, exhaust gas performance and braking performance, in a vehicle as a movable body. The control system includes a detection unit that detects, as gain state quantity, at least one of vehicle speed, driving efficiency, exhaust gas purification performance, braking force and braking efficiency, a detection unit that detects, as risk state quantity, at least one of risk of reduction of the vehicle speed, risk of reduction of the driving efficiency, risk of degradation of the exhaust gas purification performance, risk of reduction of the braking force, and risk of reduction of the braking efficiency, a calculation unit that calculates a probability of occurrence of deviation of each of the detected state quantities from a corresponding target, and a modification unit that modifies input/output characteristics of an actuator related to the energy efficiency, the exhaust gas performance and the braking performance, when the probability calculated for the risk state quantity is within a predetermined range and the probability calculated for the gain state quantity is out of a predetermined range.

In accordance with this invention, it is possible, based on the specific gain and risk in the vehicle, to change the input/output characteristics of the actuator related to the gain state quantity when the risk is low and the gain is low as well. This improves controllability.

According to yet another aspect of the present invention, a control system controls at least one of energy efficiency, driving performance, exhaust gas performance and braking performance, in a vehicle as a movable body. The control system includes a detection unit that detects, as gain state quantity, at least one of vehicle speed, driving efficiency, exhaust gas purification performance, braking force and braking efficiency, a detection unit that detects, as risk state quantity, at least one of risk of reduction of the vehicle speed, risk of reduction of the driving efficiency, risk of degradation of the exhaust gas purification performance, risk of reduction of the braking force, and risk of reduction of the braking efficiency, a calculation unit that calculates a probability of occurrence of deviation of each of the detected state quantities from a corresponding target, and an execution unit that executes a risk aversion process when the probability calculated for the risk state quantity is out of a predetermined range.

In accordance with this invention, based on the specific gain and risk in the vehicle, the risk aversion process is immediately conducted when the risk is high, since it means that abnormality is likely to occur or has actually occurred. This can secure stability of the control system.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a block diagram of the control system according to the first embodiment.

FIG. 13 is a flowchart illustrating a control structure of a program for the processing of the electric power generating system shown in FIG. 12.

FIGS. 20-21 are time charts in the control system according to the third embodiment.

DESCRIPTION OF THE PREFERRED EMBODIMENTS

Figure 1:
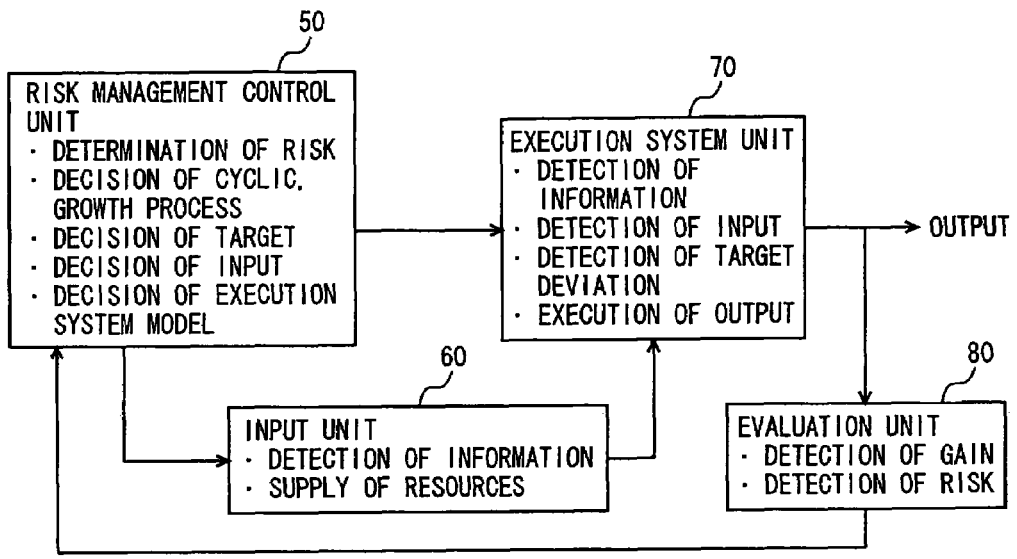
FIG. 1 schematically shows a configuration of a control system according to a first embodiment of the present invention.

Hereinafter, embodiments of the present invention will be described with reference to the drawings. In the following description, the same elements have the same reference characters allotted. Their names and functions are also identical. Thus, detailed description thereof will not be repeated.

First Embodiment

A control system according to the first embodiment of the present invention is now briefly explained. Referring to FIG. 1, a configuration of the control system of the present embodiment is described.

As shown in FIG. 1, the control system includes a risk management control unit 50, an input unit 60, an execution system unit 70, and an evaluation unit 80.

Risk management control unit 50 has functions of determining risk, deciding a cyclic, growth process, deciding a target, deciding an input, and deciding an execution system model.

Input unit 60 has functions of detecting information and supplying resources. Execution system unit 70 has functions of detecting information, detecting an input, detecting target deviation, and executing an output. Evaluation unit 80 has functions of detecting gain and detecting risk.

Here, the risk management predicts an unwanted, negative influence in a probabilistic manner, and causes a desired function to be realized in a higher probability. Such a risk management function is applied to the control system described above, to realize the function of retaining cycling for growth of the control system.

The critical features of the risk management are: that output gain and risk are subject to management in the same dimension; that changes of state quantities such as the output gain, risk and others are captured in a probabilistic manner, and a target is set in a probabilistic manner to perform feedback control taking account of risk; and that it has a function of deciding, according to the risk, a cyclic mechanism and an operating method aiming at maintenance of the cyclic function and growth of the control system.

Figure 2:
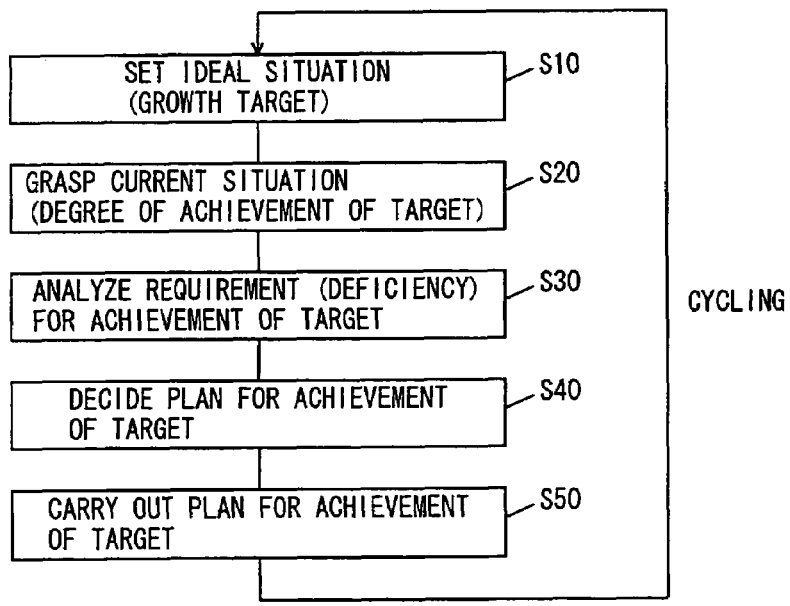
FIG. 2 is a flowchart schematically illustrating processing procedure in the control system according to the first embodiment.

FIG. 2 shows a flowchart of the cyclic, growth process in the control system as described above.

In step (hereinafter, abbreviated as "S") 10, the control system sets an ideal situation (growth target). In S20, the control system grasps the current situation (degree of achievement of target). In S30, the control system analyzes requirement (deficiency) for achievement of the target. In S40, the control system decides a plan for achievement of the target. In S50, the control system carries out the plan for achievement of the target.

After S50, the process returns to S10. Repeating the steps in a cyclic manner, the control system can maintain the cyclic function in accordance with the risk, which allows the control system to grow.

Figure 3:
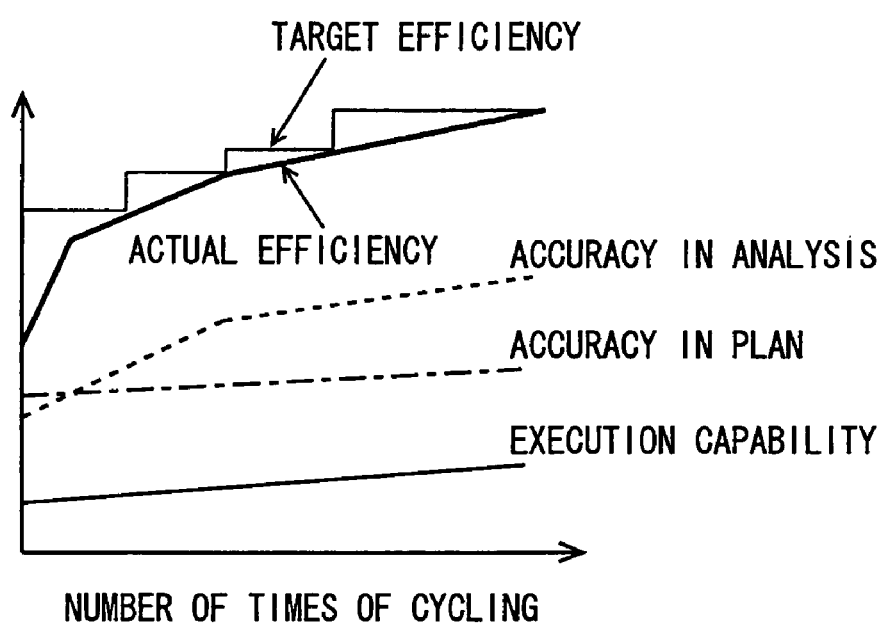
FIG. 3 schematically shows a result of the processing in the control system according to the first embodiment.

Specifically, as shown in FIG. 3, actual efficiency is gradually improved as the target efficiency is increased progressively, resulting in growth of the control system.

The control system according to an embodiment of the present invention is characterized in that gain and risk are subject to management in the probability dimension, which is now explained in conjunction with FIGS. 4-7. To detect convergence on a target, deviation variance needs to be grasped in a probabilistic manner, so that target functions as shown in FIGS. 4-7 are set.

Figure 4:
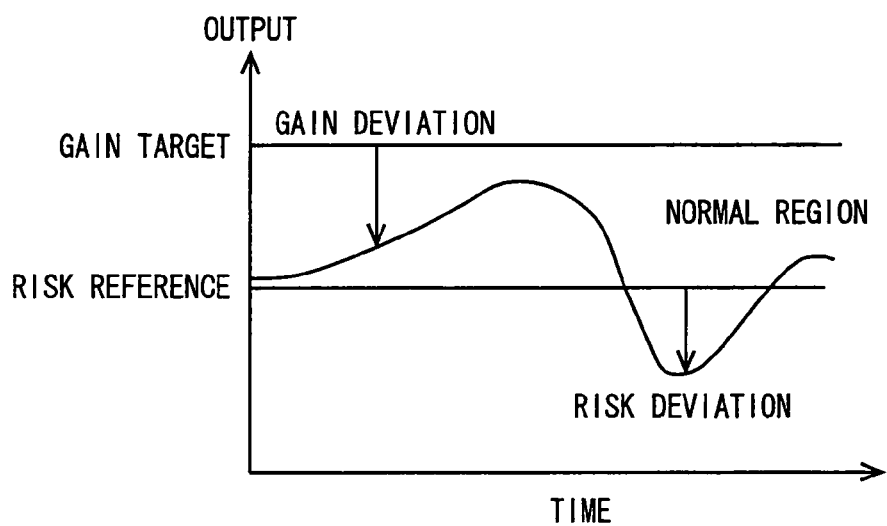
FIGS. 4-7 show target functions that are set in the control system according to the first embodiment.
Figure 5:
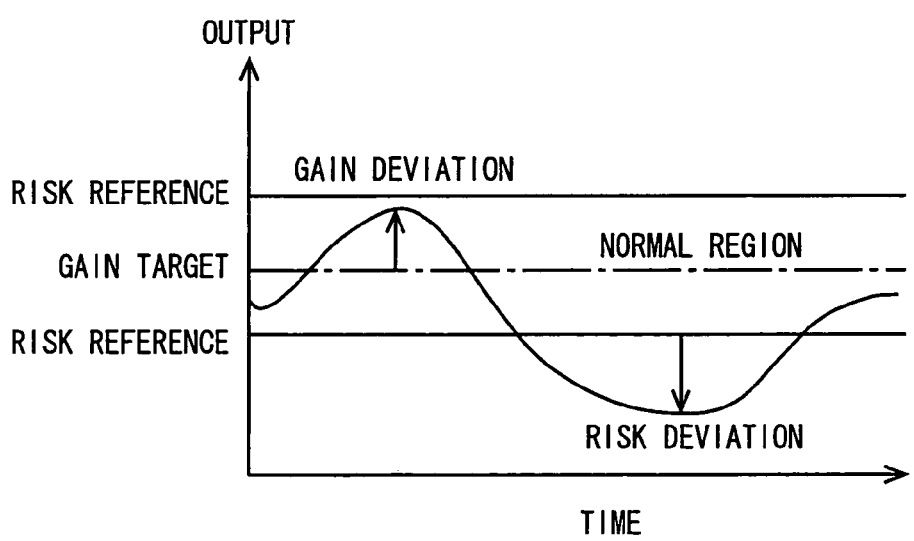

FIGS. 4 and 5 each show gain deviation and risk deviation, with the horizontal and vertical axes representing time and output, respectively. The curve in each of FIGS. 4 and 5 shows the state quantity of an actual controlled object. The gain deviation corresponds to a difference of the actual gain with respect to the gain target. The risk deviation corresponds to a difference of the actual risk with respect to the risk reference.

Figure 6:
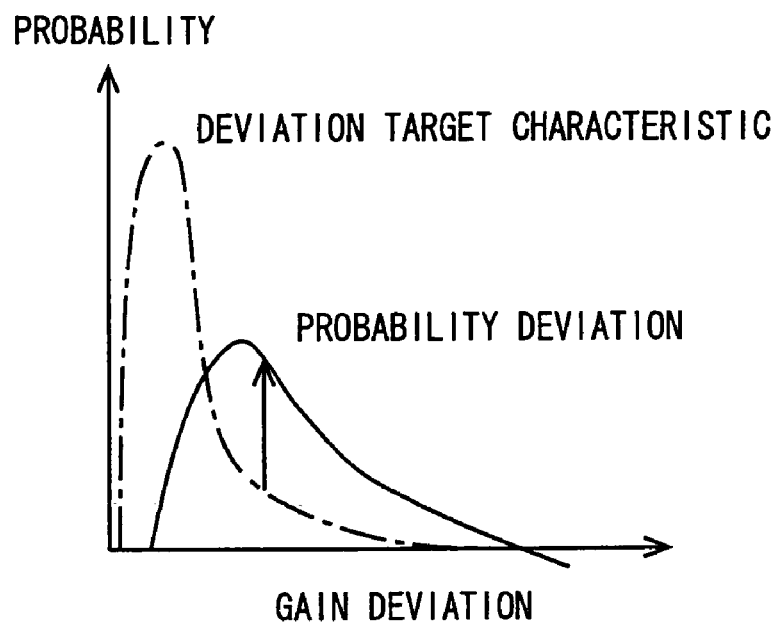
Figure 7:
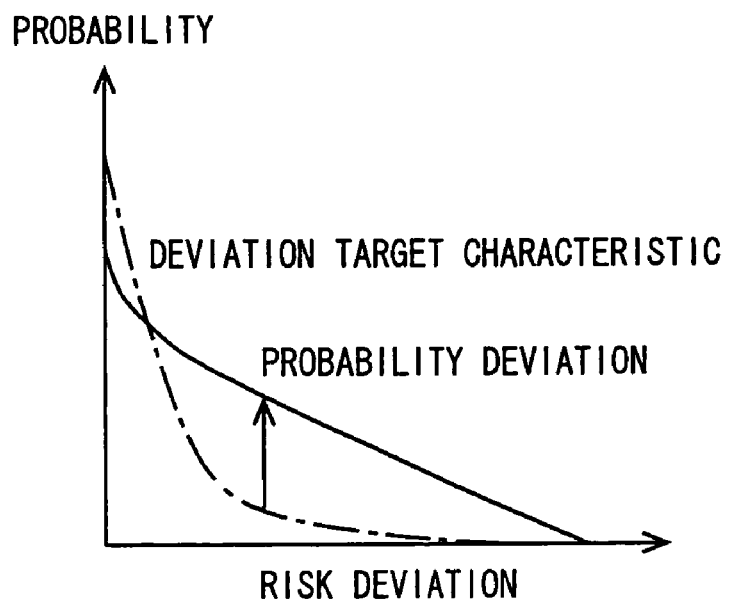

FIG. 6 is a histogram with the horizontal and vertical axes representing gain deviation and probability of its occurrence, respectively. FIG. 7 is a histogram with the horizontal and vertical axes representing risk deviation and its occurrence probability, respectively.

As in FIG. 6, the target characteristic of the gain deviation and the probability deviation are expressed, with the probability deviation being shifted to the side where the gain deviation is greater. This is due to the fact that, while the deviation target characteristic has probability distribution as represented by the dashed line converging at the region where the gain deviation is small, actual deviation has probability distribution as represented by the solid line.

As to the risk deviation, as shown in FIG. 7, the deviation target characteristic has probability distribution as represented by the dashed line which increases in probability in the region where the risk deviation is small and decreases as the risk deviation increases. By comparison, the probability deviation has a characteristic that the probability increases in the region where the risk deviation is greater than that of the deviation target characteristic. This is because, compared to the target risk deviation characteristic, the probability deviation of the actual risk increases in the region where risk is high.

As thus shown in FIGS. 4-7, by capturing the deviation variance in a probabilistic manner to detect convergence on the target, it is possible to set the gain target and the risk reference in the same dimension and calculate the deviation frequency of the executed values. It is also possible to calculate the differences of the executed probability deviation characteristics of the gain and risk deviation with respect to the deviation target characteristics in the probability dimension. As such, the target can be set in the probability dimension, and an original point of risk change can be calculated. The monitoring of the risk change also enables efficient modification of the gain target taking account of growth.

FIG. 8 shows a system configuration in the case where the above-described control system is applied to a vehicle.

As shown in FIG. 8, the control system incorporated in a vehicle includes a main ECU (Electronic Control Unit) 1000 that communicates with each of a plurality of ECUs constituting the control system. Main ECU 1000 primarily executes the risk management control.

FIG. 8 shows the case where two actuators are provided. The control system includes, with main ECU 1000 as its core, an ECU (1) 100, an actuator (1) 110, an energy supply unit (1) 120, an input detection unit (1) 130, and a gain/risk detection unit (1) 140 on the actuator (1) side, and an ECU (2) 200, an actuator (2) 210, an energy supply unit (2) 220, an input detection unit (2) 230, and a gain/risk detection unit (2) 240 on the actuator (2) side.

In this configuration, if the ECUs and the actuators have a large number of functions, risk management capacity may become excessive, hindering control with main ECU 1000 alone. In such a case, sub risk management ECUs controlling the respective ECUs, and a main risk management ECU controlling the sub risk management ECUs, may be employed.

Alternatively, the actuators may be divided into groups in accordance with their functions, and a required number of risk management ECUs may be provided to share responsibility to perform risk management. Further, the shared range of responsibility may be changed in accordance with the possibility of occurrence of risk. When a risk occurs which cannot be solved with a sub risk management ECU alone, the risk management ECU in the higher level performs overall control. When the possibility of occurrence of risk in the range of which a sub risk management ECU is in charge is determined to be sufficiently low, the ECU executes backup of another ECU that is in charge of a region where the risk occurrence possibility is high.

When the control system includes a plurality of actuators, each actuator is provided with detection units of input and output characteristics, and is made to communicate with the corresponding ECU or the risk management ECU. The actuator is driven by a command from the corresponding ECU or the risk management ECU. The detection unit of the output characteristic detects an expected, positive influence (gain) and an unwanted, negative influence (risk), and performs an operation to decide the execution content of control based on the gain and risk.

Further, a unit for analyzing the degree of contribution of the input/output affecting parameters may be provided as well, to constitute a computing unit for deciding modification of target and input/output characteristics taking account of maintenance of cycling as well as growth of the control system, and an execution unit for executing the modification of the characteristics.

Figure 9:
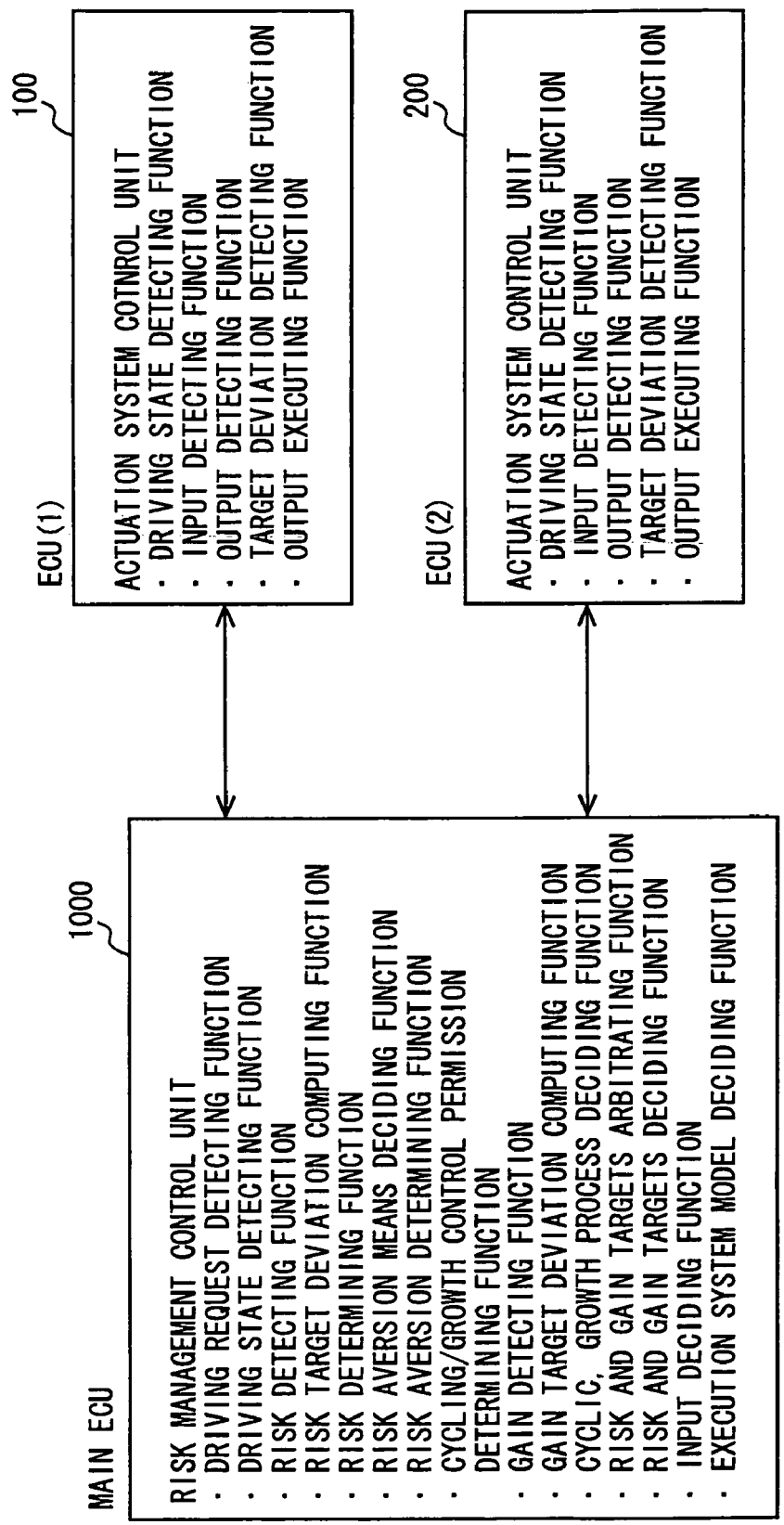
FIG. 9 shows a software configuration of the control system according to the first embodiment.

FIG. 9 shows a software configuration corresponding to the control block diagram of FIG. 8.

In main ECU 1000, the risk management control is embodied by a program. The risk management control unit has functions of detecting a driving request, detecting a driving state, detecting risk, computing risk target deviation, determining risk, deciding risk aversion means, determining risk aversion, determining permission of control involving cycling and growth, detecting gain, computing gain target deviation, deciding a cyclic, growth process, arbitrating risk/gain target, deciding risk/gain target, deciding an input, and deciding an execution system model.

ECU (1) 100 and ECU (2) 200 each include an actuation system control unit, which has functions of detecting a driving state, detecting an input, detecting an output, detecting target deviation, and executing an output.

Main ECU 1000 described above performs target setting and characteristic modification taking account of retention of the cycling as well as growth of the control system. Specifically, a characteristic detecting function is provided for each affecting parameter, and the degree of contribution is analyzed from the rate of the changed amount of the target deviation with respect to the input characteristic modified. The input characteristic is decided by determining that the maximum value of the changed amount of the target deviation corresponds to the highest degree of contribution. That is, the optimal input characteristic for a predetermined transfer characteristic is decided.

When the maximum value of the changed amount of the target deviation is not greater than a prescribed value (substantially 0), the input/output transfer characteristic is modified. That is, it is determined as the limit of the predetermined transfer characteristic, and growth with another transfer characteristic is pursued.

The input characteristic and the transfer characteristic at the time when the maximum value of the changed amount of the target deviation is not greater than the prescribed value (substantially 0) and the target deviation after modification of input/output transfer characteristic has become minimal, are decided. That is, the limit of the growth is specified, and the input/output transfer characteristic is decided.

When the maximum value of the changed amount of the target deviation continues to be greater than the prescribed value (excess target) or lower than the prescribed value (substantially 0), the target characteristic is modified in accordance with priorities. That is, the excess target is cancelled and modified to a proper target.

The control system described above performs risk determination as well. The control system has a specification unit that specifies the failure modes of A, B and C as follows. Once the failure mode is specified, risk aversion in accordance with the specified failure mode is carried out.

A. Accumulated Type Failure (Abrasion Failure)

For a failure-affecting parameter, working load × frequency is detected, which is then subtracted from the designed life to estimate the remaining life. In the case where the rate of change of the remaining life is not lower than a prescribed value, the remaining life is not greater than a prescribed value, or the remaining life is shorter than a required life, the following measures are carried out. Note that the required life may be specified from a difference between the lifetime working numbers/times and the working numbers/times or the like. The risk aversion measures to be taken against the accumulated type failure include switching to alternative means, redundancy control by auxiliary means, restriction of the working frequency, and others.

B. Failure Due to Excess Input

Stress imposed on the affecting parameter is detected to determine the degree of risk. When the degree of risk exceeds a prescribed value, risk aversion is carried out, which may be switching to alternative means, redundancy control by auxiliary means, distribution/alleviation of the load, and others. Note that the degree of risk may be determined by detecting the stress from input energy, load, temperature of generated heat, and others.

C. Chance Failure

When the failure cannot be detected in advance, it is switched to backup means after detection of the failure. When pre-detection is possible (i.e., when probability of failure is known and it exceeds a prescribed value), risk aversion is carried out by performing switching to alternative means and redundancy control by auxiliary means before detection of the failure. Note that the probability of failure may be detected by obtaining market information via communication means, or the like.

It is determined that the risk has been avoided when the risk is reduced to fall within a target range by the risk aversion measures of A, B or C described above. When it is determined that the risk has been avoided, it is determined whether recovery of normal control is possible or not. If possible, normal control is recovered. If not possible, the risk aversion control is continued.

Determination is made as to whether control taking account of maintenance of cycling and growth of the control system is permitted or not. Such control taking account of maintenance of cycling and growth of the control system is permitted when the risk is within the range of target risk probability, and prohibited when it is out of the range.

When it is determined that gain and risk are contradictory to each other, a gain/risk target arbitration unit modifies the gain and risk targets in accordance with a criterion of priority.

Figure 10:
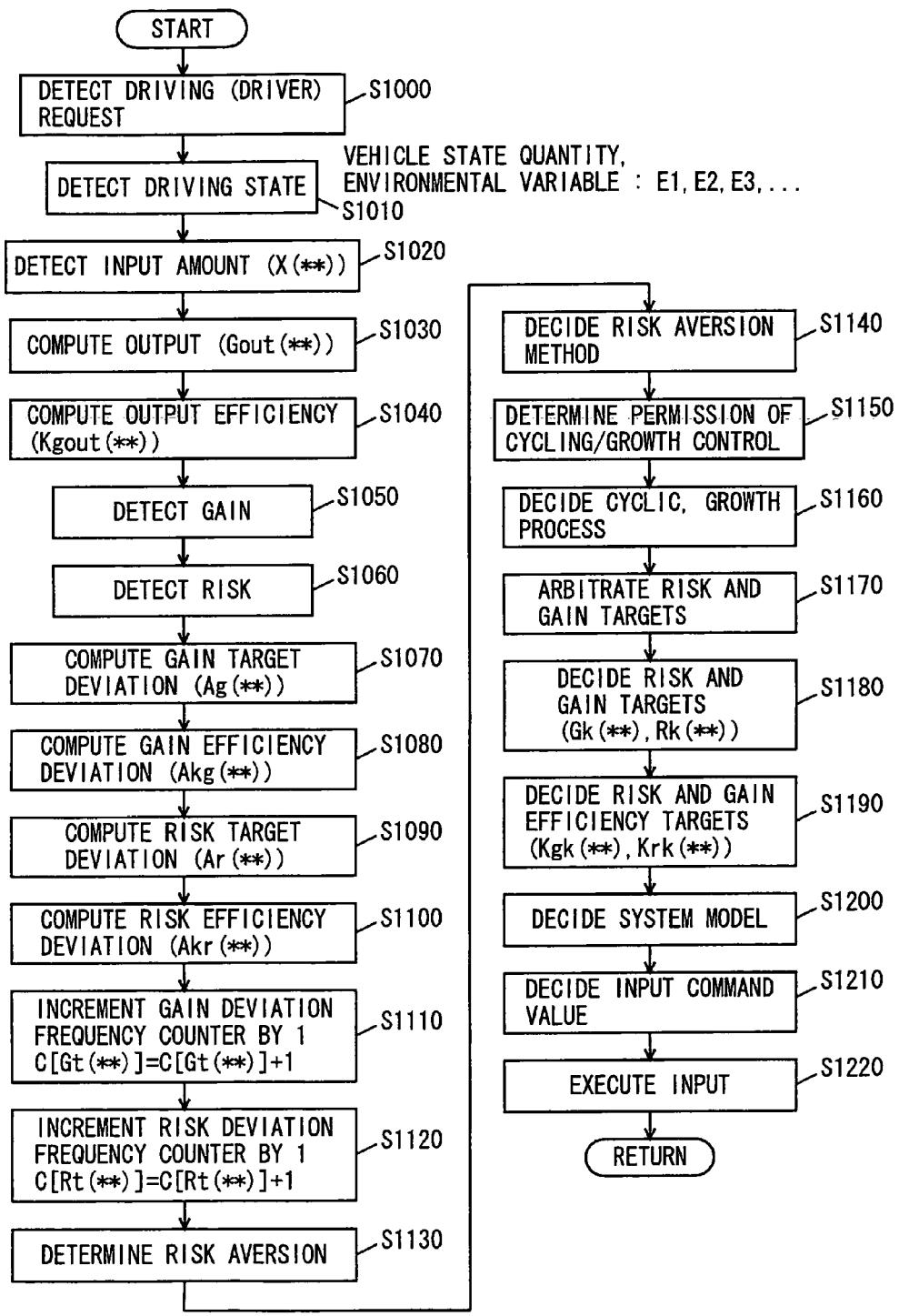
FIGS. 10-11 are flowcharts illustrating a control structure of a program that is executed in the control system according to the first embodiment.

Referring to FIG. 10, a control structure of a program carried out in the control system according to the present embodiment is explained.

Prior to the explanation, definitions of the inputs/outputs and target functions are enumerated below.

(1-1) Definition of risk
Rout=[Rout(1), Rout(2), Rout(3), . . . ]
Expressed by a function of input and degree of influence: Rout=rout(x)
Input: X=[x(1), x(2), x(3), . . . ]
(1-2) Definition of Gain
Gout=[Gout(1), Gout(2), Gout(3), . . . ]
Expressed by a function of input and degree of influence: Gout=gout(x)
Input: X=[x(1), x(2), x(3), . . . ]
(1-3) Definition of risk efficiency
Krout=[Krout(1), Krout(2), Krout(3), . . . ]
Expressed by a ratio of risk with respect to input: Krout=Rout/x
(1-4) Definition of Gain efficiency
Kgout=[Kgout(1), Kgout(2), Kgout(3), . . . ]
Expressed by a ratio of gain with respect to input: Kgout=Gout/x
(2-1) Target Risk Probability function
Art=[Art(1), Art(2), Art(3), . . . ]
Expressed by a function of degree of influence and probability of occurrence: Art=art(r)
r: degree of influence on risk
(2-2) Target Gain Probability function
Agt=[Agt(1), Agt(2), Agt(3), . . . ]
Expressed by a function of degree of influence and probability of occurrence: Agt=agt(g)
g: degree of influence on gain
(2-3) Target Risk efficiency Probability function
Akrt=[Akrt(1), Akrt(2), Akrt(3), . . . ]
Expressed by a function of risk efficiency and occurrence probability: Akrt=akrt(kr)
kr: risk efficiency
(2-4) Target gain efficiency Probability function
Akgt=[Akgt(1), Akgt(2), Akgt(3), . . . ]
Expressed by a function of gain efficiency and occurrence probability: Akgt=akgt(g)
kg: gain efficiency
(3-1) Probability function of risk
(3-1-1) When reference risk Rk is not defined
Ar=[Ar(1), Ar(2), Ar(3), . . . ]
Ar=ar(Rout)
(3-1-2) When reference risk Rk is defined
Rk=[Rk(1), Rk(2), . . . ]
With reference risk Rk, Ar=ar (Rk−Rout)
(3-2) Probability function of gain
(3-2-1) When reference gain Gk is not defined
Ag=[Ag(1), Ag(2), Ag(3), . . . ]
Ag=ag(Gout)
(3-2-2) When reference gain Gk is defined
Gk=[Gk(1), Gk(2), . . . ]
With reference gain Gk, Ag=ag (Gk−Gout)
(4-1) Probability function of risk efficiency
(4-1-1) When reference risk efficience Krk is not defined
Akr=[Akr(1), Akr(2), Akr(3), . . . ]
Akr=akr(Krout)
(4-1-2) When reference risk efficience Krk is defined
With reference risk efficiency Krk,
Krk=[Krk(1), Krk(2), . . . ]
Akr=akr (Krk−Krout)
(4-2) Probability function of gain efficiency
(4-2-1) When Reference gain efficiency Kgk is not defined
Akg=[Akg(1), Akg(2), Akg(3), . . . ]
Akg=akg(Kgout)
(4-2-2) When reference gain efficiency Kgk is defined
With reference gain efficiency Kgk,
Kgk=[Kgk(1), Kgk(2), . . . ]
Akg=akg (Kgk−Kgout)
(5-1) Risk Probability deviation
dAr=[dAr(1), dAr(2), dAr(3), . . . ]
dAr=Art−Ar
(5-2) Gain probability deviation
dAg=[dAg(1), dAg(2), dAg(3), . . . ]
dAg=Agt−Ag
(6-1) Risk efficience probability deviation
dAkr=[dAkr(1), dAkr(2), dAkr(3), . . . ]
dAkr=Akrt−Akr
(6-2) Gain efficiency probability deviation
dAkg=[dAkg(1), dAkg(2), dAkg(3), . . . ]
dAkg=Akgt−Akg
The following program is carried out on assumption of the above definitions.

In S1000, the control system detects a driving (or driver) request. In S1010, it detects a driving state. In S1020, it detects an input amount (X(**)).

In S1030, the control system computes an output (Gout ()). In S1040, it computes output efficiency (Kgout()). The control system then detects gain in S1050 and risk in S1060.

In S1070, the control system computes gain target deviation (Ag()). In S1080, it computes gain efficiency deviation (Akg()). In S1090, it computes risk target deviation (Ar()), and in S1100, it computes risk efficiency deviation (Akr()).

In S1110, the control system increments a gain deviation frequency counter by 1. In S1120, it increments a risk deviation frequency counter by 1. The processes in S1110 and S1120 create the histograms of probability distribution shown in FIGS. 6 and 7.

In S1130, the control system carries out a risk aversion determination process. In S1140, it decides a risk aversion method. In S1150, it determines whether to permit control involving cycling and growth or not.

In S1160, the control system decides a cyclic, growth process. In S1170, the control system arbitrates risk and gain targets. In S1180, it decides risk and gain targets (Gk(), Rk()). In S1190, it decides the risk and gain efficiency targets (Kgk(), Krk()).

In S1200, the control system decides a system model. In S1210, it decides an input command value. In S1220, it carries out control based on the input value.

Figure 11:
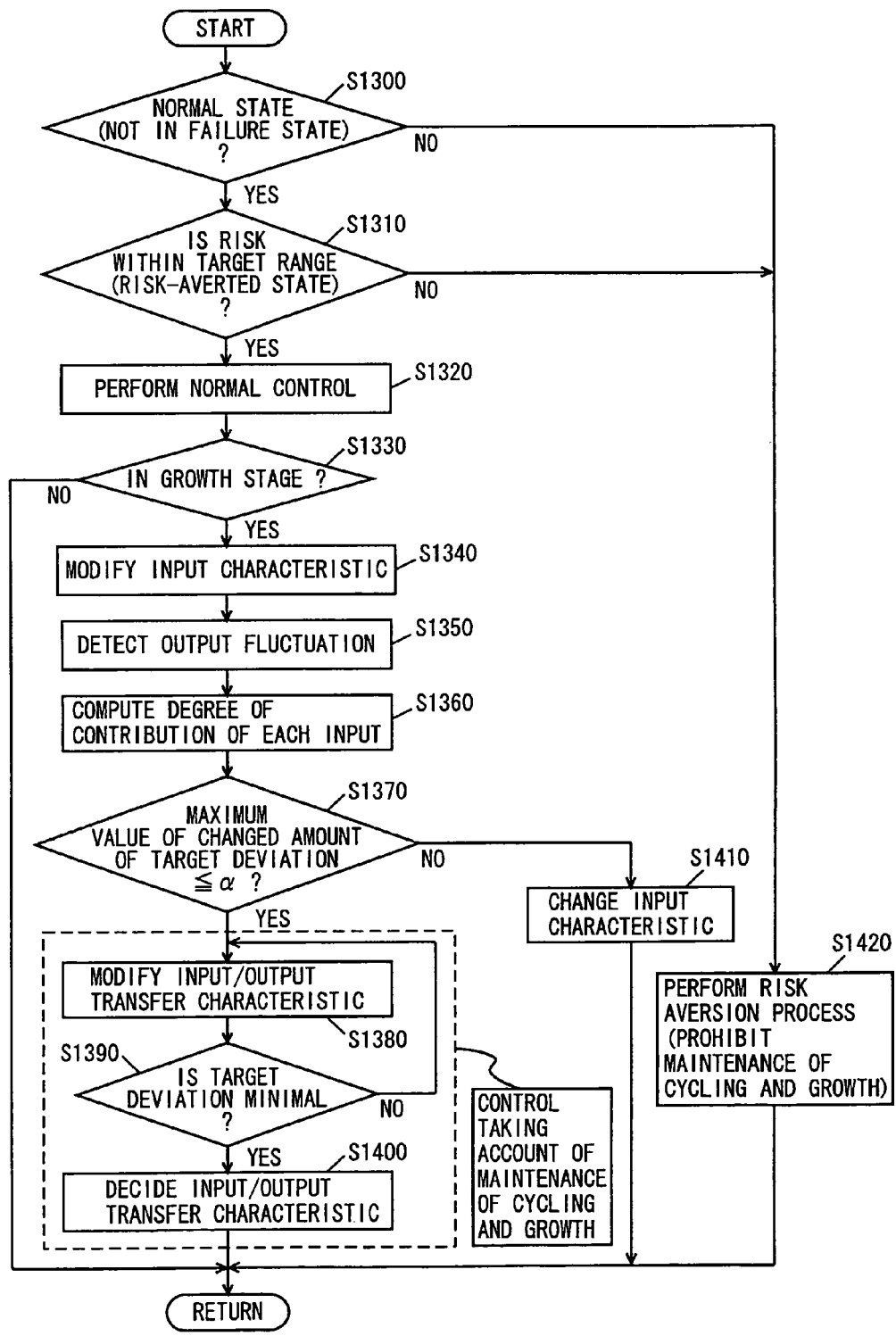

Referring to FIG. 11, the processes in S1140-S1160 are explained in detail.

In S1300, the control system determines whether the system is in a normal state. That is, it determines whether it can be confirmed that the system is not in the failure state. When it is confirmed that the system is in a normal state (YES in S1300), the process goes to S1310. If not (NO in S1300), the process goes to S1420.

In S1310, the control system determines whether risk is within a target range. That is, it determines whether it is in a risk-averted state. If the risk is within the target range (YES in S1310), the process goes to S1320. If not (NO in S1310), the process goes to S1420.

In S1320, the control system performs normal control. In S1330, the control system determines whether the control system itself is in a stage of growth. If the control system itself is in the growth stage (YES in S1330), the process goes to S1340. If not (NO in S1330), the process is terminated.

In S1340, the control system modifies input characteristic. In S1350, it detects output fluctuation. In S1360, it computes the degree of contribution of each input.

In S1370, the control system determines whether the maximum value of the changed amount of the target deviation is not greater than a predetermined threshold value α. If the maximum value of the changed amount of the target deviation is equal to or lower than the predetermined threshold value α (YES in S1370), the process goes to S1380. If not (NO in S1370), the process goes to S1410.

In S1380, the control system modifies the input/output transfer characteristic. In S1390, the control system determines whether the target deviation is minimal. If the target deviation is minimal (YES in S1390), the process goes to S1400. If not (NO in S1390), the process returns to S1380, and the cycling is maintained until the target deviation becomes minimal.

In S1400, the control system decides the input/output transfer characteristic.

In S1410, the control system modifies the input characteristic.

In S1420, the control system performs a risk aversion process. At this time, the maintenance of the cycling and the growth of the control system itself are prohibited.

As described above, according to the control system of the present embodiment, gain and risk are subject to management in the same probability dimension, and the target setting is done taking account of risk. Since the risk is taken into consideration, even if the system confronts risk, it can maintain the cyclic function and allow growth of the control system itself within the range of the risk.

Second Embodiment

A more specific embodiment in the case of applying the above-described control system to a vehicle is now described as a second embodiment of the present invention. The control block of the present embodiment is similar to that shown in FIG. 8, and thus, detailed description thereof is not repeated here.

The vehicle control system according to the present embodiment aims at achieving compatibility of fuel efficiency (energy efficiency) in tire longitudinal force drive control, exhaust gas purification performance and braking performance in a high order. Target functions and parameter settings are effected to this end.

Firstly, the target functions are enumerated in the following.

(1) Target gain probability function
(1-1) Vehicle speed: Agt(1)
Engine output Agt(11), Electric power generated amount Agt(12), Electric power accumulated amount Agt(13), Motor torque Agt(14), Motor rotation number Agt(15), CVT (Continuously Variable Transmission) gear ratio Agt(16), Driving force Agt(17)
(1-2) Exhaust Gas Performance: Agt(2)
Air fuel ratio Agt(21),
CO exhaust amount Agt(22), NOx exhaust amount Agt(23), HC exhaust amount Agt(24)
(1-3) Braking force: Agt(3)
Actuator driving current Agt(31), Brake hydraulic pressure Agt(32), Regenerative torque Agt(33)
(2) Target gain efficiency probability function
(2-1) Driving efficiency: Akgt(1)
Engine efficiency Akgt(11), Electric power generation efficiency Akgt(12), Electric power accumulation efficiency Akgt(13),
Motor efficiency Akgt(14)
(2-2) Braking efficiency: Akgt(2)
Braking energy Akgt(21), Consumed energy Akgt(22), Regenerative energy Akgt(23),
Motor efficiency Akgt(14)
(3) Target risk probability function
(3-1) Risk of reduction of vehicle speed: Art(1)
Change of engine output Art(11), Change of electric power generated amount Art(12), Change of electric power accumulated amount Art(13),
Change of motor torque Art(14), Change of motor rotation number Art(15),
Change of CVT gear ratio Art(16), Change of driving force Art(17)
(3-2) Risk of degradation of exhaust gas: Art(2)
Change of air fuel ratio Art(21),
Change of CO exhaust amount Art(22), Change of NOx exhaust amount Art(23), Change of HC exhaust amount Art(24)

(3-3) Risk of reduction of braking force: Art(3)
Change of actuator driving current Art(31), Change of brake hydraulic pressure Art(32),
Change of regenerative torque Art(33)
(4) Target Risk efficiency Probability Function
(4-1) Risk of degradation of driving efficiency: Akrt(1)
Change of engine efficiency Akrt(11), Change of electric power generation efficiency Akrt(12), Change of electric power accumulation efficiency Akrt(13),
Change of motor efficiency Akrt(14)
(4-2) Risk of degradation of braking efficiency: Akrt(2)
Change of braking energy Akrt(21), Change of consumed energy Akrt(22),
Change of regenerative energy Akrt(23)
Hereinafter, the parameter settings are enumerated.
Transfer System
(1) Driving Output Gain
Input
Fuel injection quantity X(11)
Engine Output
Gout(11)=gout(11) {X(11)}
Reference characteristic: Gk(11)
Actual deviation probability: Ag(11)=ag {Gk(11)–Gout(11)}
Target deviation probability: Agt(11)
Electric Power Generated Amount
Gout(12)=gout(12) {Gout(11)}
Reference characteristic: Gk(12)
Actual deviation probability: Ag(12)=ag {Gk(12)–Gout(12)}
Target deviation probability: Agt(12)
Electric Power Accumulated Amount
Gout(13)=gout(13) {Gout(12)}
Reference characteristic: Gk(13)
Actual deviation probability: Ag(13)=ag {Gk(13)–Gout(13)}
Target deviation probability: Agt(13)
Second Input
Electric power supply amount X(12)
Motor Torque
Gout(14)=gout(14) {X(12)}
Reference characteristic: Gk(14)
Actual deviation probability: Ag(14)=ag {Gk(14)–Gout(14)}
Target deviation probability: Agt(14)
Motor Rotation Number
Gout(15)=gout(15) {X(12)}
Reference characteristic: Gk(15)
Actual deviation probability: Ag(15)=ag {Gk(15)–Gout(15)}
Target deviation probability: Agt(15)
CVT Gear Ratio
Gout(16)=gout(16) {Gout(15)}
Reference characteristic: Gk(16)
Actual deviation probability: Ag(16)=ag {Gk(16)–Gout(16)}
Target deviation probability: Agt(16)
Driving Force
Gout(17)=gout(17) {Gout(16)}
Reference characteristic: Gk(17)
Actual deviation probability: Ag(17)=ag {Gk(17)–Gout(17)}
Target deviation probability: Agt(17)
Vehicle Speed
Gout(1)=gout(1) {Gout(16)}
Reference characteristic: Gk(1)
Actual deviation probability: Ag(1)=ag {Gk(1)–Gout(1)}
Target deviation probability: Agt(1)
Vehicle Output
Gout(18)=Gout(1)×Gout(17)
Reference characteristic: Gk(18)
Actual deviation probability: Ag(18)=ag {Gk(18)–Gout(18)}
Target deviation probability: Agt(18)
(2) Driving Output Risk
Input
Fuel injection quantity X(11)
Engine Output
Gout(11)=gout(11) {X(11)}
Reference characteristic: Rk(11)
Actual deviation probability: Ar(11) ar {Rk(11)–Gout(11)}
Target deviation probability: Art(11)
Electric Power Generated Amount
Gout(12)=gout(12) {Gout(11)}
Reference characteristic: Rk(12)
Actual deviation probability: Ar(12)=ar {Rk(12)–Gout(12)}
Target deviation probability: Art(12)
Electric Power Accumulated Amount
Gout(13)=gout(13) {Gout(12)}
Reference characteristic: Rk(13)
Actual deviation probability: Ar(13)=ar {Rk(13)–Gout(13)}
Target deviation probability: Art(13)
Second Input
Electric power supply amount X(12)
Motor Torque
Gout(14)=gout(14) {X(12)}
Reference characteristic: Rk(14)
Actual deviation probability: Ar(14)=ar {Rk(14)–Gout(14)}
Target deviation probability: Art(14)
Motor Rotation Number
Gout(15)=gout(15) {X(12)}
Reference characteristic: Rk(15)
Actual deviation probability: Ar(15)=ar {Rk(15)–Gout(15)}
Target deviation probability: Art(15)
CVT Gear Ratio
Gout(16)=gout(16) {Gout(15)}
Reference characteristic: Rk(16)
Actual deviation probability: Ar(16)=ar {Rk(16)–Gout(16)}
Target deviation probability: Art(16)
Driving Force
Gout(17)=gout(17) {Gout(16)}
Reference characteristic: Rk(17)
Actual deviation probability: Ar(17)=ar {Rk(17)–Gout(17)}
Target deviation probability: Art(17)
Vehicle Speed
Gout(1)=gout(1) {Gout(16)}
Reference characteristic: Rk(1)
Actual deviation probability: Ar(1)=ar {Rk(1)–Gout(1)}
Target deviation probability: Art(1)
Vehicle Output
Gout(18)=Gout(1)×Gout(17)
Reference characteristic: Rk(18)
Actual deviation probability: Ar(18)=ar {Rk(18)–Gout(18)}
Target deviation probability: Art(18)
(3) Driving Gain Efficiency
Engine Heat Efficiency Kgout(11)=kgout(11) {X(11)}
Reference characteristic: Kgk(11)
Actual deviation probability: Akg(11)=akg {Kgk(11)−Kgout(11)}
Target deviation probability: Akgt(11)
Electric Power Generation Efficiency
Kgout(12)=kgout(12) {Kgout(11)}
Reference characteristic: Kgk(12)
Actual deviation probability: Akg(12)=akg {Kgk(12)−Kgout(12)}
Target deviation probability: Akgt(12)
Charge Efficiency
Kgout(13)=kgout(13) {Kgout(12)}
Reference characteristic: Kgk(13)
Actual deviation probability: Akg(13)=akg {Kgk(13)−Kgout(13)}
Target deviation probability: Akgt(13)
Motor Efficiency
Kgout(14)=kgout(14) {X(12)}
Reference characteristic: Kgk(14)
Actual deviation probability: Akg(14)=akg {Kgk(14)−Kgout(14)}
Target deviation probability: Akgt(14)
Driving Efficiency
Kgout(1)=kgout(1) {Kgout(14)}
Reference characteristic: Kgk(1)
Actual deviation probability: Akg(1)=akg {Kgk(1)−Kgout(1)}
Target deviation probability: Akgt(1)
(4) Driving Risk efficience
Engine Heat Efficiency
Kgout(11)=kgout(11) {X(11)}
Reference characteristic: Krk(11)
Actual deviation probability: Akr(11)=akr {Krk(11)−Kgout(11)}
Target deviation probability: Akrt(11)
Electric Power Generation Efficiency
Kgout(12)=kgout(12) {Kgout(11)}
Reference characteristic: Krk(12)
Actual deviation probability: Akr(12)=Akr {Krk(12)−Kgout(12)}
Target deviation probability: Akrt(12)
Charge Efficiency
Kgout(13)=kgout(13) {Kgout(12)}
Reference characteristic: Krk(13)
Actual deviation probability: Akr(13)=Akr {Krk(13)−Kgout(13)}
Target deviation probability: Akrt(13)
Motor Efficiency
Kgout(14)=kgout(14) {X(12)}
Reference characteristic: Krk(14)
Actual deviation probability: Akr(14)=akr {Krk(14)−Kgout(14)}
Target deviation probability: Akrt(14)
Driving Efficiency
Kgout(1)=kgout(1) {Kgout(14)}
Reference characteristic: Krk(1)
Actual deviation probability: Akr(1)=akr {Krk(1)−Kgout(1)}
Target deviation probability: Akrt(1)
(5) Exhaust Gas Performance
Air Fuel Ratio
Gout(21)=gout(21) {X(11)}
Reference characteristic: Gk(21)
Actual deviation probability: Ag(21)=ag {Gk(21)−Gout(21)}
Target deviation probability: Agt(21)
CO Exhaust Amount
Gout(22)=gout(22) {Gout(21)}
Reference characteristic: Gk(22)
Actual deviation probability: Ag(22)=ag {Gk(22)−Gout(22)}
Target deviation probability: Agt(22)
NOx Exhaust Amount
Gout(23)=gout(23) {Gout(21)}
Reference characteristic: Gk(23)
Actual deviation probability: Ag(23)=ag {Gk(23)−Gout(23)}
Target deviation probability: Agt(23)
HC Exhaust Amount
Gout(24)=gout(24) {Gout(21)}
Reference characteristic: Gk(24)
Actual deviation probability: Ag(24)=ag {Gk(24)−Gout(24)}
Target deviation probability: Agt(24)
Exhaust Gas Performance
Gout(2)=gout(2) {Gout(21)}
Reference characteristic: Gk(2)
Actual deviation probability: Ag(2)=ag {Gk(2)−Gout(2)}
Target deviation probability: Agt(2)
(6) Risk of Degradation of Exhaust Gas
Air Fuel Ratio
Gout(21)=gout(21) {X(11)}
Reference characteristic: Rk(21)
Actual deviation probability: Ar(21)=ar {Rk(21)−Gout(21)}
Target deviation probability: Art(21)
CO Exhaust Amount
Gout(22)=gout(22) {Gout(21)}
Reference characteristic: Rk(22)
Actual deviation probability: Ar(22)=ar {Rk(22)−Gout(22)}
Target deviation probability: Art(22)
NOx Exhaust Amount
Gout(23)=gout(23) {Gout(21)}
Reference characteristic: Rk(23)
Actual deviation probability: Ar(23)=ar {Rk(23)−Gout(23)}
Target deviation probability: Art(23)
HC Exhaust Amount
Gout(24)=gout(24) {Gout(21)}
Reference characteristic: Rk(24)
Actual deviation probability: Ar(24)=ar {Rk(24)−Gout(24)}
Target deviation probability: Art(24)
Exhaust Gas Performance
Gout(2)=gout(2) {Gout(21)}
Reference characteristic: Rk(2)
Actual deviation probability: Ar(2)=ar {Rk(2)−Gout(2)}
Target deviation probability: Art(2)
(7) Braking Force Gain
Input
Electric power supply amount X(31)
Actuator Driving Current
Gout(31)=gout(31) {X(31)}
Reference characteristic: Gk(31)
Actual deviation probability: Ag(31)=ag {Gk(31)−Gout(31)}
Target deviation probability: Agt(31)
Brake Hydraulic Pressure
Gout(32)=gout(32) {Gout(31)}
Reference characteristic: Gk(32)
Actual deviation probability: Ag(32)=ag {Gk(32)−Gout(32)}

Target deviation probability: Agt(32)
Regenerative Torque
Gout(33)=gout(33) {Gout(33)}
Reference characteristic: Gk(33)
Actual deviation probability: Ag(33)=ag {Gk(33)–Gout(33)}
Target deviation probability: Agt(33)
Braking Force
Gout(3)=gout(3) {Gout(32)}
Reference characteristic: Gk(3)
Actual deviation probability: Ag(3)=ag {Gk(3)–Gout(3)}
Target deviation probability: Agt(3)
(8) Risk of Reduction of Braking Force Input
Electric power supply amount X(31)
Actuator Driving Current
Gout(31)=gout(31) {X(31)}
Reference characteristic: Rk(31)
Actual deviation probability: Ar(31)=ar {Rk(31)–Gout(31)}
Target deviation probability: Art(31)
Brake Hydraulic Pressure
Gout(32)=gout(32) {Gout(31)}
Reference characteristic Rk(32)
Actual deviation probability: Ar(32)=ar {Rk(32)–Gout(32)}
Target deviation probability: Art(32)
Regenerative Torque
Gout(33)=gout(33) {Gout(33)}
Reference characteristic: Rk(33)
Actual deviation probability: Ar(33)=ar {Rk(33)–Gout(33)}
Target deviation probability: Art(33)
Braking Force
Gout(3)=gout(3) {Gout(32)}
Reference characteristic: Rk(3)
Actual deviation probability: Ar(3)=ar {Rk(3)–Gout(3)}
Target deviation probability: Art(3)
(9) Braking Efficiency
Braking Energy
Kgout(21)=kgout(21) {Gout(21)}
Reference characteristic: Kgk(21)
Actual deviation probability: Akg(21)=akg {Kgk(21)–Kgout(21)}
Target deviation probability: Akgt(21)
Consumed Energy
Kgout(22)=kgout(22) {Kgout(21)}
Reference characteristic: Kgk(22)
Actual deviation probability: Akg(22)=akg {Kgk(22)–Kgout(22)}
Target deviation probability: Akgt(22)
Regenerative Energy
Kgout(23)=kgout(23) {Kgout(21)}
Reference characteristic: Kgk(23)
Actual deviation probability: Akg(23)=akg {Kgk(23)–Kgout(23)}
Target deviation probability: Akgt(23)
Braking Efficiency
Kgout(2)=kgout(2) {Kgout(23)}
Reference characteristic: Kgk(2)
Actual deviation probability: Akg(2)=akg {Kgk(2)–Kgout(2)}
Target deviation probability: Akgt(2)
(10) Risk of Degradation of Braking Efficiency
Braking Energy
Kgout(21)=kgout(21) {Gout(1)}
Reference characteristic: Krk(21)
Actual deviation probability: Akr(21)=akr {Krk(21)–Kgout(21)}
Target deviation probability: Akrt(21)
Consumed Energy
Kgout(22)=kgout(22) {Kgout(21)}
Reference characteristic: Krk(22)
Actual deviation probability: Akr(22)=akr {Krk(22)–Kgout(22)}
Target deviation probability: Akrt(22)
Regenerative Energy
Kgout(23)=kgout(23) {Kgout(21)}
Reference characteristic: Krk(23)
Actual deviation probability: Akr(23)=akr {Krk(23)–Kgout(23)}
Target deviation probability: Akrt(23)
Braking Efficiency
Kgout(2)=kgout(2) {Kgout(23)}
Reference characteristic: Krk(2)
Actual deviation probability: Akr(2)=akr {Krk(2)–Kgout(2)}
Target deviation probability: Akrt(2)

In the tire longitudinal force drive control, the vehicle control system according to the present embodiment performs:

(1) change of the target,
(2) analysis of means for achieving the target, and
(3) decision of the means for achieving the target.

(1) As to the change of the target, when a prescribed target is achieved, a higher target is set for further growth. When there is no chance of achieving the target in spite of being in a normal state, the prescribed target is lowered. The balance of deviation is decided by weighting the process of achieving the target in accordance with the priority of each parameter.

(2) The analysis of the target achieving means is carried out for the purposes of analyzing the degree of contribution of any parameter associated with gain and risk. Used as an index at the time of analysis is a rate of the changed amount of the target deviation with respect to the changed amount of the parameter.

(3) The decision of the target achieving means is carried out by setting priority for each parameter and by weighting the execution means in accordance with the priority.

In the vehicle control system according to the present embodiment, the control schemes (operating rules) are set:

(1) to minimize the ratio of engine output with respect to motor output in accordance with SOC (States Of Charge);
(2) to maximize regenerative brake energy in accordance with vehicle kinetic energy at the time of braking;
(3) to maximize engine heat efficiency and motor efficiency;
(4) to cause exhaust gas purification performance to achieve target performance; and
(5) to cause the risk of the control system to fall within a target range.

Figure 12:
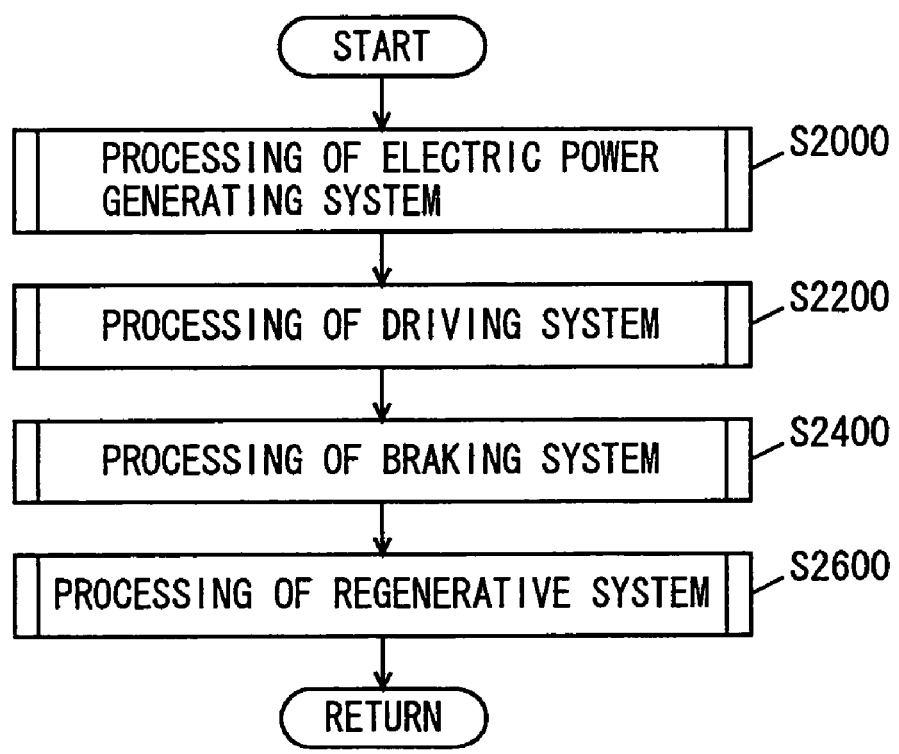
FIG. 12 is a flowchart illustrating a control structure of a main program that is executed in a control system according to a second embodiment of the present invention.

Referring to FIG. 12, the overall flowchart of the vehicle control system according to the present embodiment is explained.

In S2000, the vehicle control system performs processing on the electric power generating system. In S2200, it performs processing on the driving system.

In S2400, the vehicle control system performs processing on the driving system, and in S2600, it performs processing on the regenerative system.

Referring to FIG. 13, the processing of the electric power generating system in S2000 of FIG. 12 is explained in detail.

In S2010, the vehicle control system detects an electric power accumulated amount. In S2020, it calculates a target electric power accumulated amount. In S2030, it determines whether the accumulated amount is smaller than the target value or not. If the accumulated amount is smaller than the target value (YES in S2030), the process goes to S2040. If not (NO in S2030), the process goes to S2050.

In S2040, the vehicle control system starts an engine (electric power generator). In S2050, it stops operation of the engine (electric power generator).

In S2060, the vehicle control system determines whether the exhaust gas risk is smaller than a risk target or not. If the exhaust gas risk is smaller than the risk target (YES in S2060), the process goes to S2070. If not (NO in S2060), the process goes to S2090.

In S2070, the vehicle control system increases the air fuel ratio. That is, it increases the efficiency of the engine and the electric power generator. In S2080, it changes an air fuel ratio map.

In S2090, the vehicle control system decreases the air fuel ratio. That is, it decreases the efficiency of the engine and the electric power generator. In S2100, it changes the air fuel ratio map.

Figure 14:
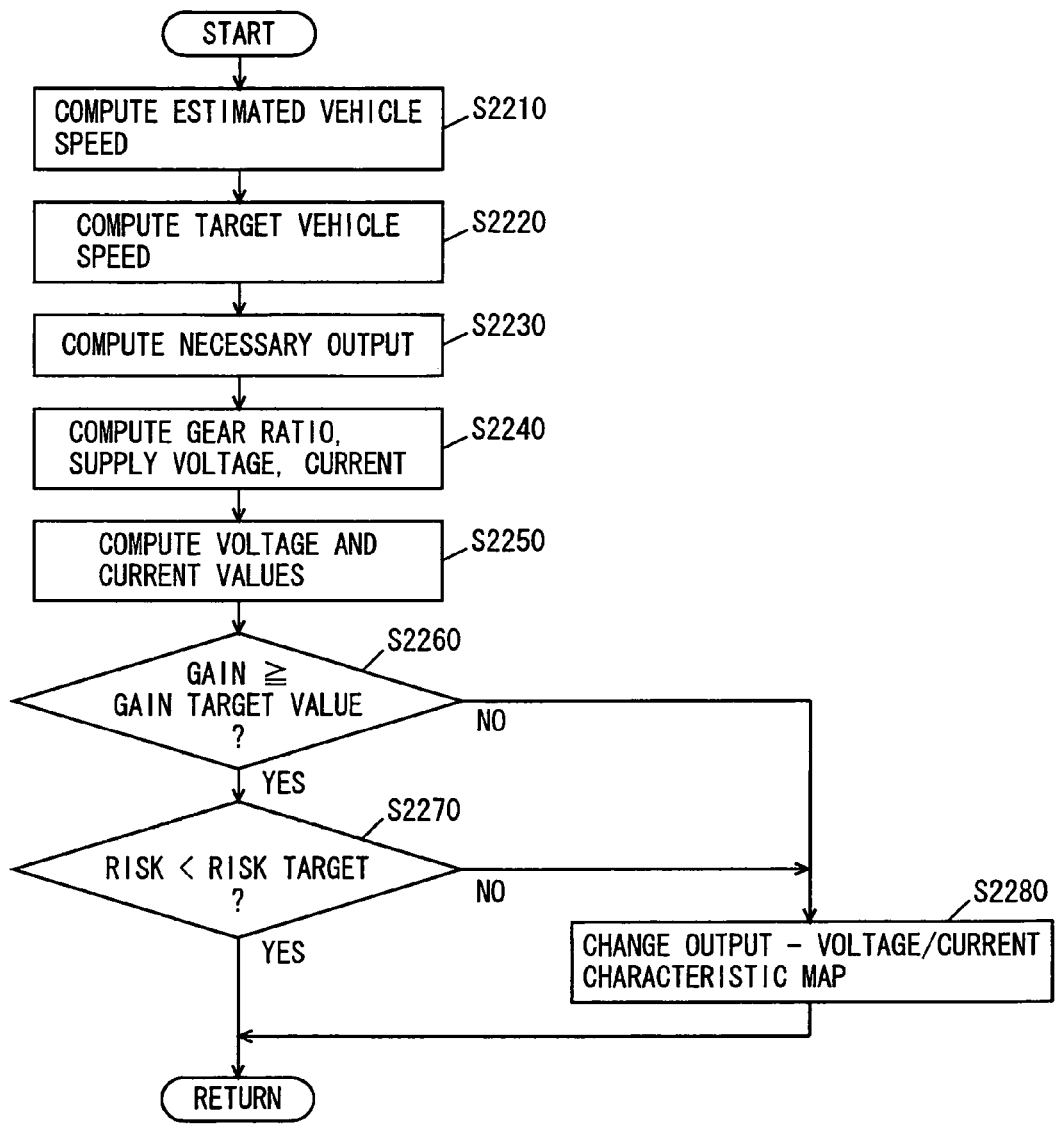
FIG. 14 is a flowchart illustrating a control structure of a program for the processing of the driving system shown in FIG. 12.

Referring to FIG. 14, the processing of the driving system in S2200 of FIG. 12 is explained in detail.

In S2210, the vehicle control system computes an estimated vehicle speed. In S2220, it computes a target vehicle speed.

In S2230, the vehicle control system computes a necessary output. In S2240, it computes a gear ratio, a supply voltage, and a current supplied to the motor. In S2250, it computes voltage and current values.

In S2260, the vehicle control system determines whether gain is not less than a predetermined gain target value. If the gain is equal to or greater than the predetermined gain target value (YES in S2260), the process goes to S2270. If not (NO in S2270), the process goes to S2280.

In S2270, the vehicle control system determines whether risk is smaller than a predetermined risk target value. If the risk is smaller than the predetermined risk target value (YES in S2270), the process is terminated. If not (NO in S2270), the process goes to S2280.

In S2280, the vehicle control system changes the output, or voltage/current characteristic map.

Figure 15:
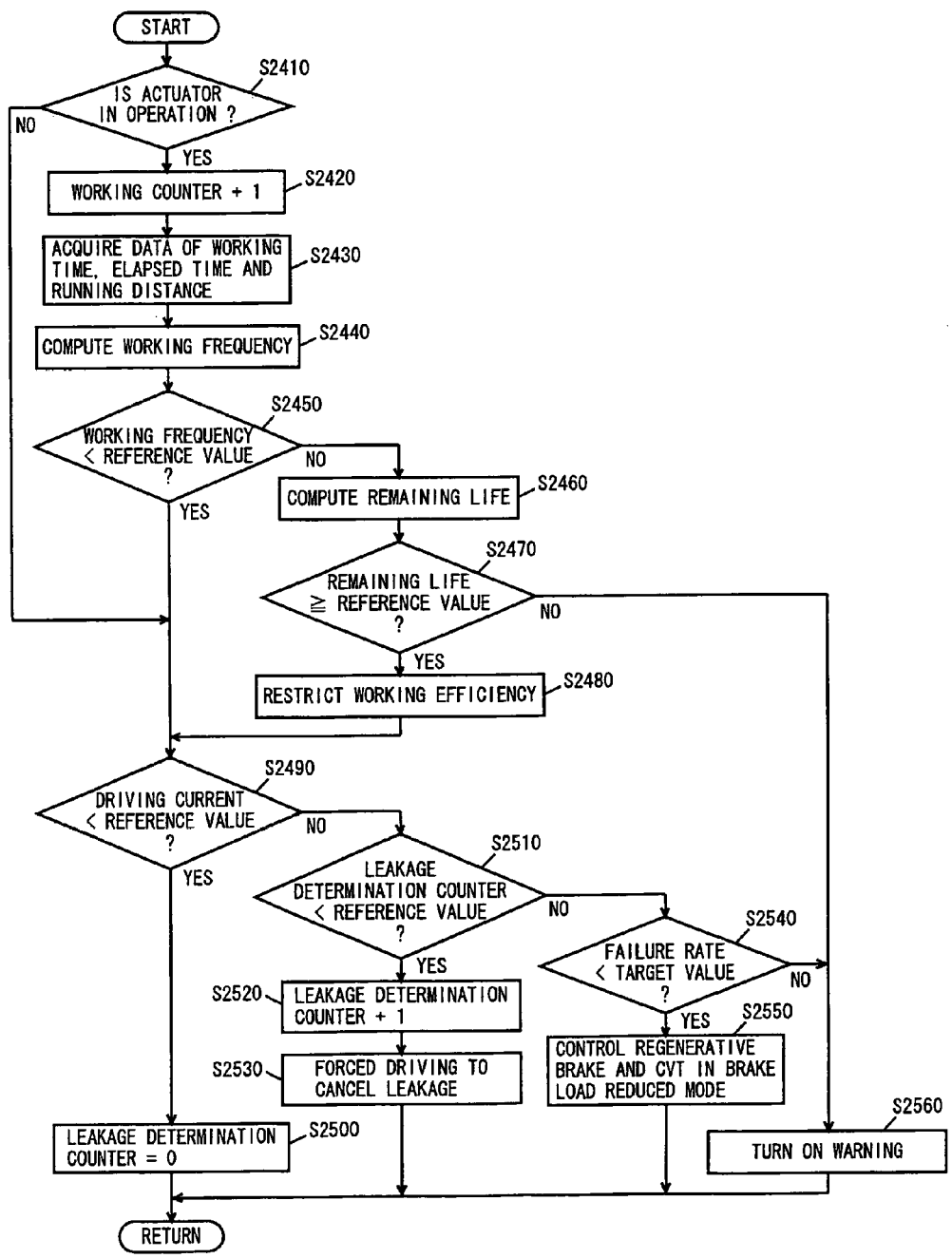
FIG. 15 is a flowchart illustrating a control structure of a program for the processing of the braking system shown in FIG. 12.

Referring to FIG. 15, the processing of the braking system in S2400 of FIG. 12 is explained in detail.

In S2410, the vehicle control system determines whether the actuator is in operation or not. If the actuator is in operation (YES in S2410), the process goes to S2420. If not (NO in S2410), the process goes to S2490.

In S2420, the vehicle control system increments a working counter by 1. In S2430, it acquires working time, elapsed time, and running distance data. In S2440, it computes working frequency. In S2450, it determines whether the working frequency is smaller than a predetermined reference value. If the working frequency is smaller than the predetermined reference value (YES in S2450), the process goes to S2490. If not (NO in S2450), the process goes to S2460.

In S2460, the vehicle control system computes the remaining life. In S2470, it determines whether the remaining life is not less than a predetermined reference value. If the remaining life is equal to or greater than the reference value (YES in S2470), the process goes to S2480. If not (NO in S2470), the process goes to S2560.

In S2480, the vehicle control system carries out a process of restricting the working frequency. Thereafter, the process goes to S2490.

In S2490, the vehicle control system determines whether the driving current is smaller than a predetermined reference value. If the driving current is smaller than the predetermined reference value (YES in S2490), the process goes to S2500. If not (NO in S2490), the process goes to S2510.

In S2500, the vehicle control system assigns 0 to a leakage determination counter.

In S2510, the vehicle control system determines whether the leakage determination counter is smaller than a predetermined reference value. If the counter is smaller than the predetermined reference value (YES in S2510), the process goes to S2520. If not NO in S2510), the process goes to S2540.

In S2520, the vehicle control system increments the leakage determination counter by 1. In S2530, it carries out forced driving to cancel leakage.

In S2540, the vehicle control system determines whether the failure rate is smaller than a predetermined target value. If the failure rate is smaller than the predetermined target value (YES in S2540), the process goes to S2550. If not (NO in S2540), the process goes to S2560.

In S2550, the vehicle control system carries out control of regenerative brake and CVT in a brake load reduced mode.

In S2560, the vehicle control system turns on a warning lamp.

Figure 16:
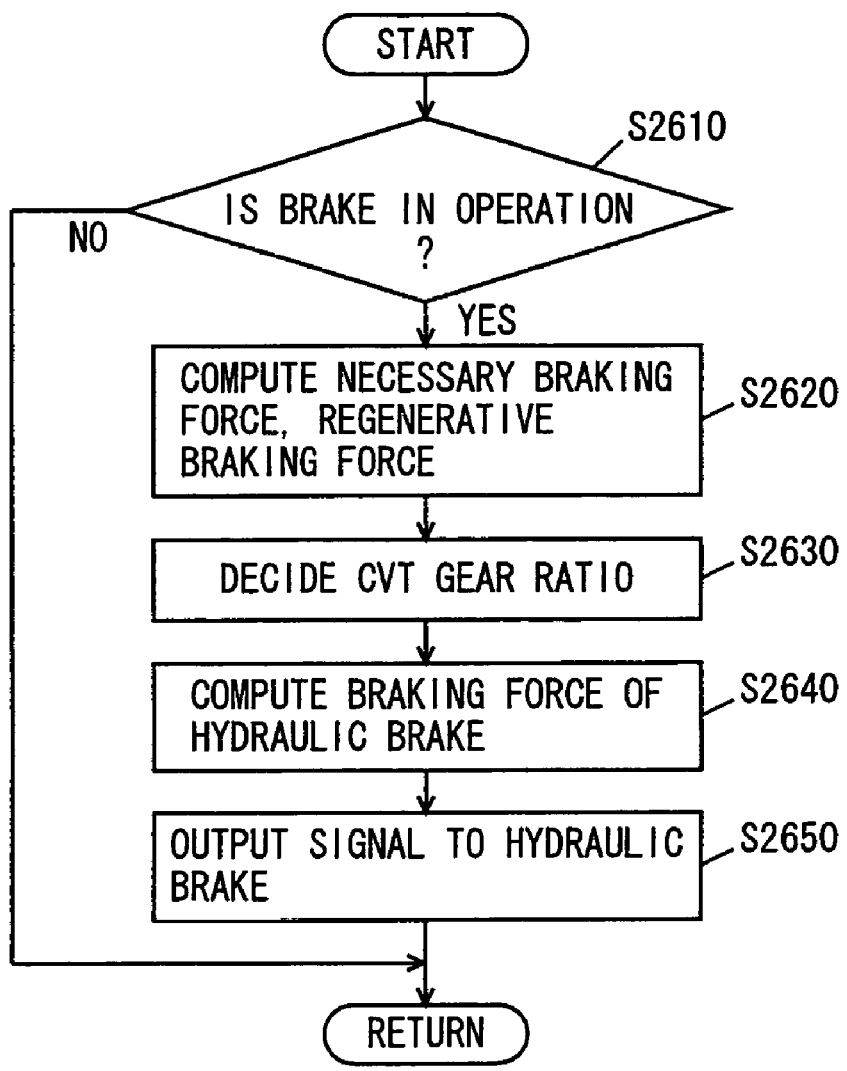
FIG. 16 is a flowchart illustrating a control structure of a program for the processing of the regenerative system shown in FIG. 12.

Referring to FIG. 16, the processing of the regenerative system performed in S2600 of FIG. 12 is explained in detail.

In S2610, the vehicle control system determines whether the brake is in operation or not. If the brake is in operation (YES in S2610), the process goes to S2620. If not (NO in S2610), the process is terminated.

In S2620, the vehicle control system computes necessary braking force and regenerative braking force. In S2630, it determines a CVT gear ratio. In S2640, it computes braking force of the hydraulic brake. In S2650, it outputs a command signal to the hydraulic brake.

An operation of the vehicle control system based on the above-described structures and flowcharts is now described.

In the vehicle control system having the control block as shown in FIG. 8, the main flowchart shown in FIG. 12 and the sub routines shown in FIGS. 13-16 are carried out to perform the processings of the electric power generating system, driving system, braking system and regenerative system.

In the processing of the electric power generation system, the air fuel ratio is increased, while suppressing the exhaust gas risk, to improve the engine efficiency. Output driving of high engine efficiency×electric power generation efficiency is carried out to achieve a target electric power accumulated amount. Electric power supply is carried out to increase the motor efficiency.

In the processing of the driving system, electric power supply is carried out to increase the motor efficiency. The gear ratio is decided based on the motor output and the target vehicle speed. The input parameters are the fuel injection quantity, the air fuel ratio, the motor electric power and others, and the optimum input characteristics are decided.

In the processing of the braking system, when the working frequency of the actuator exceeds the reference value due to valve leakage or the like, control is effected as follows.

The remaining life is computed from the working time, the elapsed time, the running distance and others. The process of extending life is conducted to keep the remaining life not lower than a set value. When it becomes lower than the set value, warning is output. The working frequency is restricted while the criterion of braking performance is met. The motor is supplied with electric power of reduced voltage so as to decrease the number of times of startup.

The frequency of leakage is computed based on the increase of the target deviation of the valve driving current.

When the leakage frequency exceeds a reference value, it is checked whether forced driving of the valve can improve the situation. If there is no means for restricting the leakage frequency and thus the target failure rate cannot be met, then warning is output. As a way of risk diversification, increasing the risks of the regenerative brake and the CVT within the allowable ranges to thereby increase the frequency of the regenerative brake can effectively serve as a backup function for restricting the working frequency of the ECB (Electronic Controlled Brake).

In the processing of the regenerative system, as a way of improving efficiency, the gear ratio of the transmission such as a CVT is decided such that the regenerative efficiency is increased to the greatest possible level at the initial stage of braking, since the regenerative braking torque is large in the low-speed range and torque of more than a required braking force occurs frequently. The hydraulic brake amount is reduced, and the frequency of full-charge of the battery before stopping is increased. The input parameters are the braking energy and the gear ratio, and the optimum inputs are decided. As to the transfer characteristic, a map is used to modify the relation between SOC, braking energy and gear ratio, to decide the optimum transfer characteristic.

Figure 17:
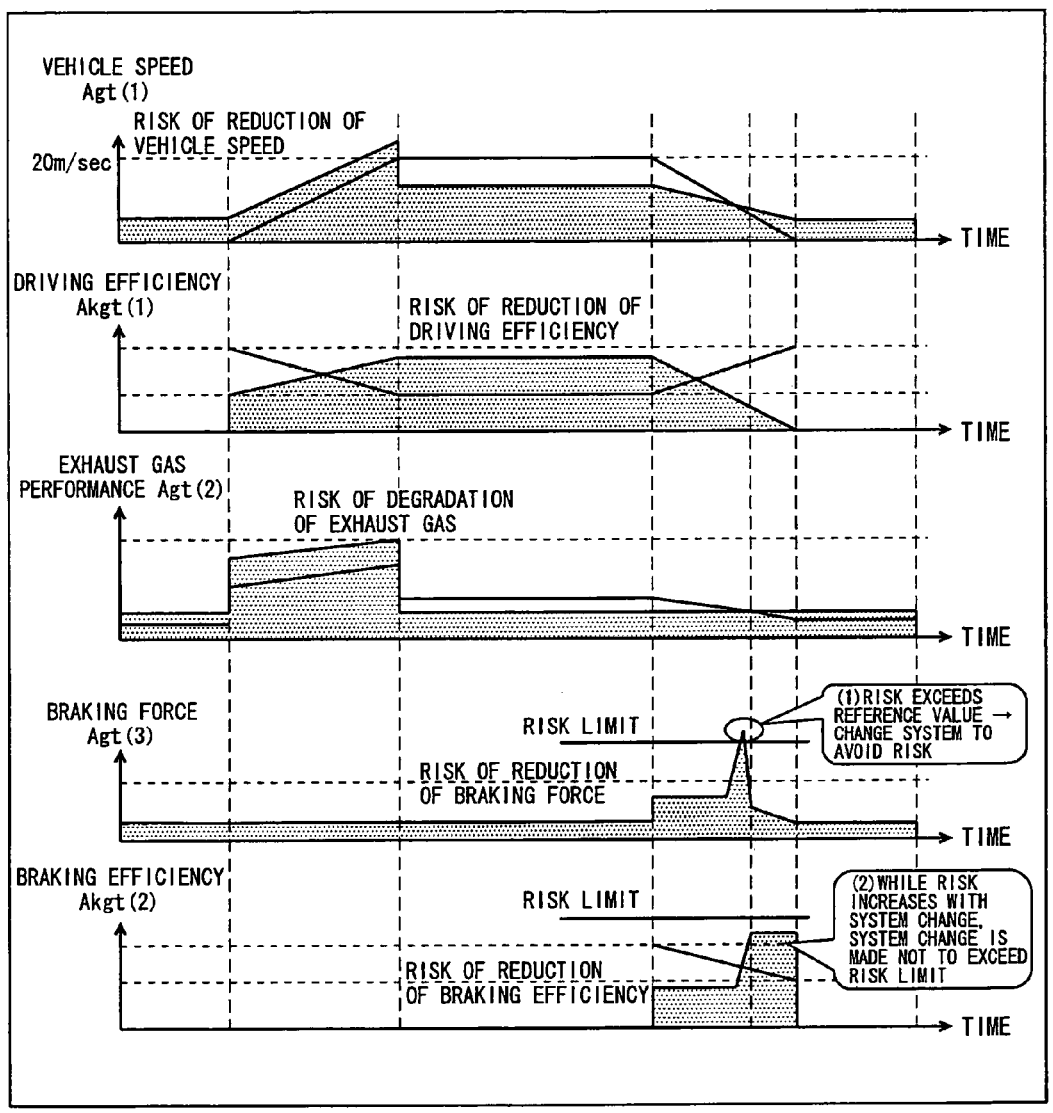
FIG. 17 is a time chart in the control system according to the second embodiment.

FIG. 17 shows changes over time of vehicle speed, driving efficiency, exhaust gas performance, braking force, and braking efficiency. As shown in FIG. 17, (1) when risk exceeds a reference level, system change is conducted to avoid risk;

(2) although the risk may increase with the system change, the system change is controlled so as not to exceed the risk limit.

As described above, according to the vehicle control system of the present embodiment, it is possible to make the fuel efficiency, energy efficiency, exhaust gas performance, and braking performance compatible in a high level in the tire longitudinal force drive control. Specifically, the ratio of the engine output with respect to the motor output is minimized in accordance with SOC, and the regenerative brake energy is maximized in accordance with the vehicle kinetic energy at the time of braking. The engine heat efficiency and the motor efficiency are maximized such that the exhaust gas performance attains the target performance. The control is carried out such that the risk of the vehicle control system converges at a target range, with the above-described conditions satisfied. Accordingly, it is possible to realize a vehicle control system that makes fuel efficiency, exhaust gas performance and braking performance compatible in a high order.

Third Embodiment

Hereinafter, the case where the control system of the present invention is applied to a vehicle control system for energy management control is explained as a third embodiment of the present invention.

The control block of the present embodiment is also similar to that explained above in conjunction with FIG. 8. Therefore, detailed description thereof is not repeated here.

Firstly, assumptions (driver request and input), and definitions of gain and risk are enumerated in the following.

(1) Assumptions (Driver Request)

Vehicle speed: start running 100 seconds after engine ON
Acceleration: accelerated up to 20 m/s in 20 seconds (1 m/s$^2$)
Steady state: steady running for 300 seconds
Deceleration: decelerated from 20 m/s to 0 m/s in 40 seconds (0.5 m/s$^2$)
Temperature: outdoor temperature: 35° C.

Indoor temperature: initial temperature: 50° C.
Target temperature: 25° C. (set at the same time as engine ON)
SOC: 80% at the initial state (2) Assumptions (Input)

Accelerated running (1 m/s$^2$): SOC consumption: 1%/s
Steady running: SOC consumption: 0.1%/s
Air-conditioned (indoor temperature≠target):
SOC consumption: 0.2%/s (temperature drop: 0.1° C./s)
Air-conditioned (indoor temperature=target):
SOC consumption: 0.1%/s
Electric power generation: SOC increase: 0.2%/s
Regeneration: SOC increase: 0.5%/s (only with vehicle speed of not slower than 5 m/s)

(3) Definition of Gain

Figure 19:
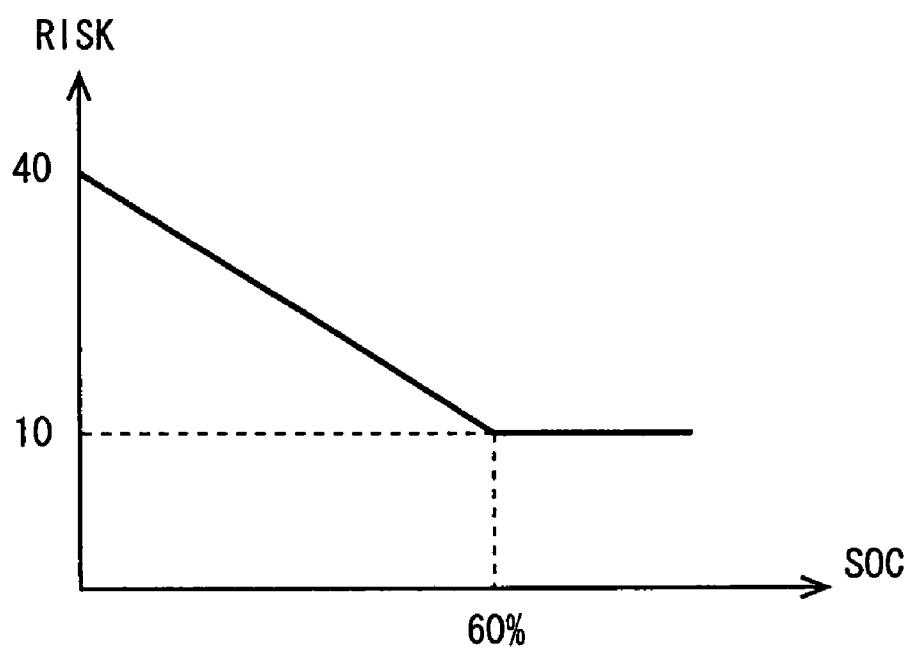
FIG. 19 shows a battery risk function in the control system according to the third embodiment.

Driving system Acceleration (m/s$^2$)×30.0
Vehicle speed×2.0
Braking system Decelerated state: deceleration (m/s$^2$)× 80.0
Battery SOC×0.5
Air conditioner ignored (4) Definition of Risk Driving system Stopped state: 5.0
Accelerated state: 1.0×vehicle speed (m/s)+10.00
Steady running/deceleration: 10.0
Braking system Running state: 10.0
Decelerated state: 40.0 (−20.0 upon regenerative braking)
Battery See FIG. 19
Air conditioner ignored The gain and risk definitions may be changed based on the experimental values.

For example, the risk at the accelerated state of the driving system may be increased if the reliability at the time of acceleration is decreased due to aging. When it is found from data that the braking force decreases at a low temperature, the braking risk may be increased only for the low temperature. If it is found from data that reliability of the regenerative braking is unexpectedly good, the risk of the regenerative braking may be reduced. As such, the influence of aging is taken into consideration.

Figure 18:
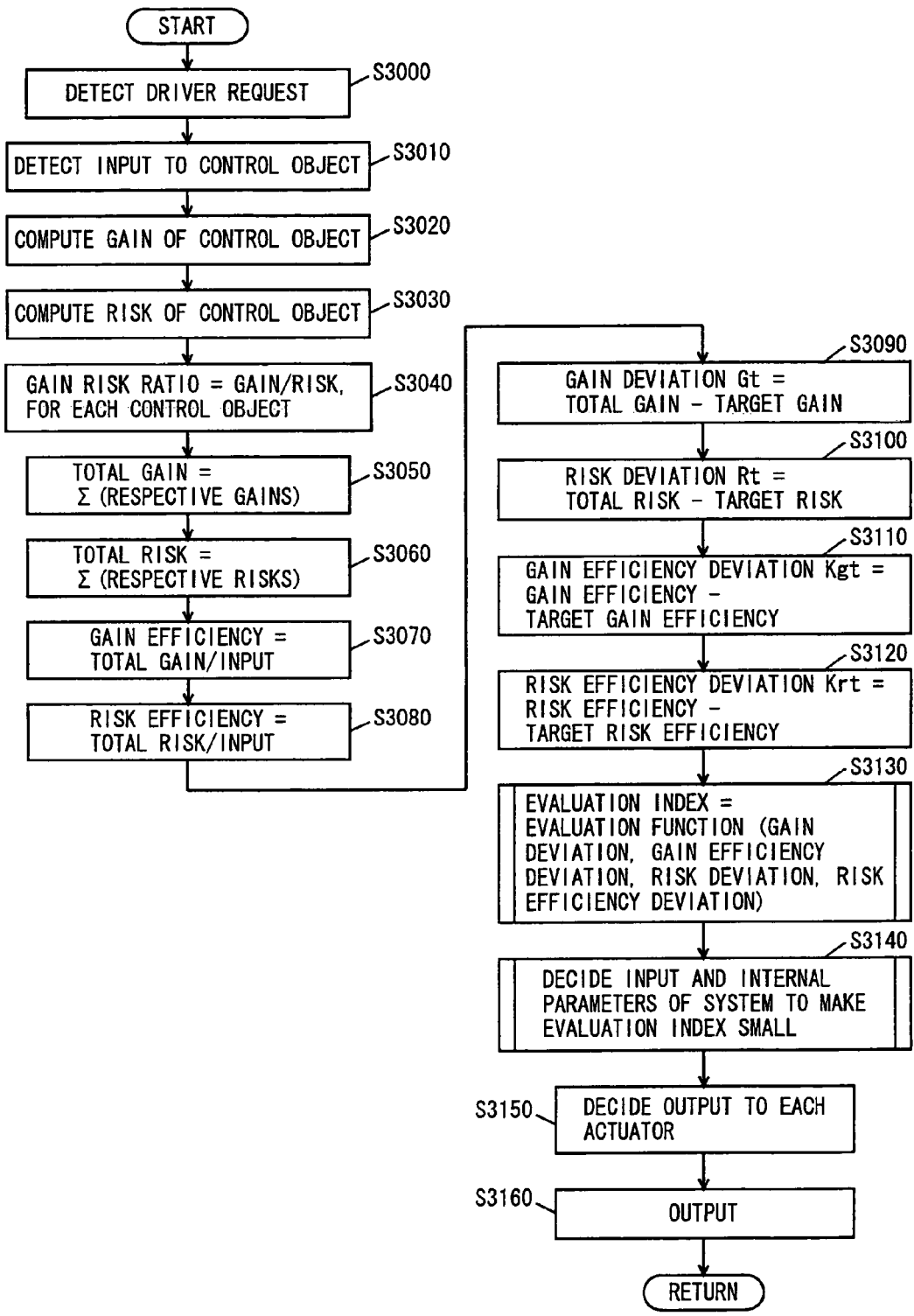
FIG. 18 is a flowchart illustrating a control structure of a main program that is executed in a control system according to a third embodiment of the present invention.

Referring to FIG. 18, a control structure of a program performed in the vehicle control system according to the present embodiment is described.

In S3000, the vehicle control system detects a driver request. In S3010, it detects an input to an object of control. In S3020, the vehicle control system computes gain of the control object. In S3030, it computes risk of the control object.

In S3040, the vehicle control system calculates a gain risk ratio=gain/risk, for each control object. In S3050, it computes total gain, and in S3060, it computes total risk. In S3070, it calculates gain efficiency=total gain/input.

In S3080, the vehicle control system computes risk efficiency=total risk/input.

In S3090, it computes gain deviation Gt=total gain−target gain. In S3100, it computes risk deviation Rt=total risk−target risk.

In S3110, the vehicle control system computes gain efficiency deviation Kgt=gain efficiency−target gain efficiency. In S3120, it computes risk efficiency deviation Krt=risk efficiency−target risk efficiency.

In S3130, the vehicle control system calculates an evaluation index as follows: evaluation index=evaluation function (gain deviation, gain efficiency deviation, risk deviation, risk efficiency deviation). In S3140, the vehicle control system decides input and internal parameters of the control system such that the evaluation index becomes small.

Evaluation index E is expressed as evaluation function A×state quantity X. When evaluation function A=(a1, a2, a3, a4) and state quantity X is a transposed matrix of X=(Gt, Kgt, Rt, Krt), then evaluation index E=gain deviation Gt×a1+gain deviation efficiency Kgt×a2+risk deviation Rt×a3+risk efficiency deviation Krt×a4. For example, evaluation function A=(1, 1, −1, −1).

In S3150, the vehicle control system decides an output to each actuator, and in S3160, it outputs a control signal to each actuator.

FIG. 19 shows the relation between the battery and the risk. As shown in FIG. 19, the risk gradually decreases in the region with SOC up to 60%, and is fixed at a low level once SOC exceeds 60%.

An operation of the vehicle control system according to the present embodiment based on the above-described structures and flowcharts is now described. More specifically, it is explained that the energy management system can realize the vehicle control system where gain and risk are subject to management in the probability dimension.

FIGS. 20(A), 20(B), 20(C) and 20(D) show changes over time of vehicle speed, temperature, SOC and input, respectively. FIGS. 21(A), 21(B), 21(C) and 21(D) show changes over time of driving gain and driving risk, braking gain and braking risk, SOC gain and SOC risk, and total gain and total risk, respectively.

Figure 21:
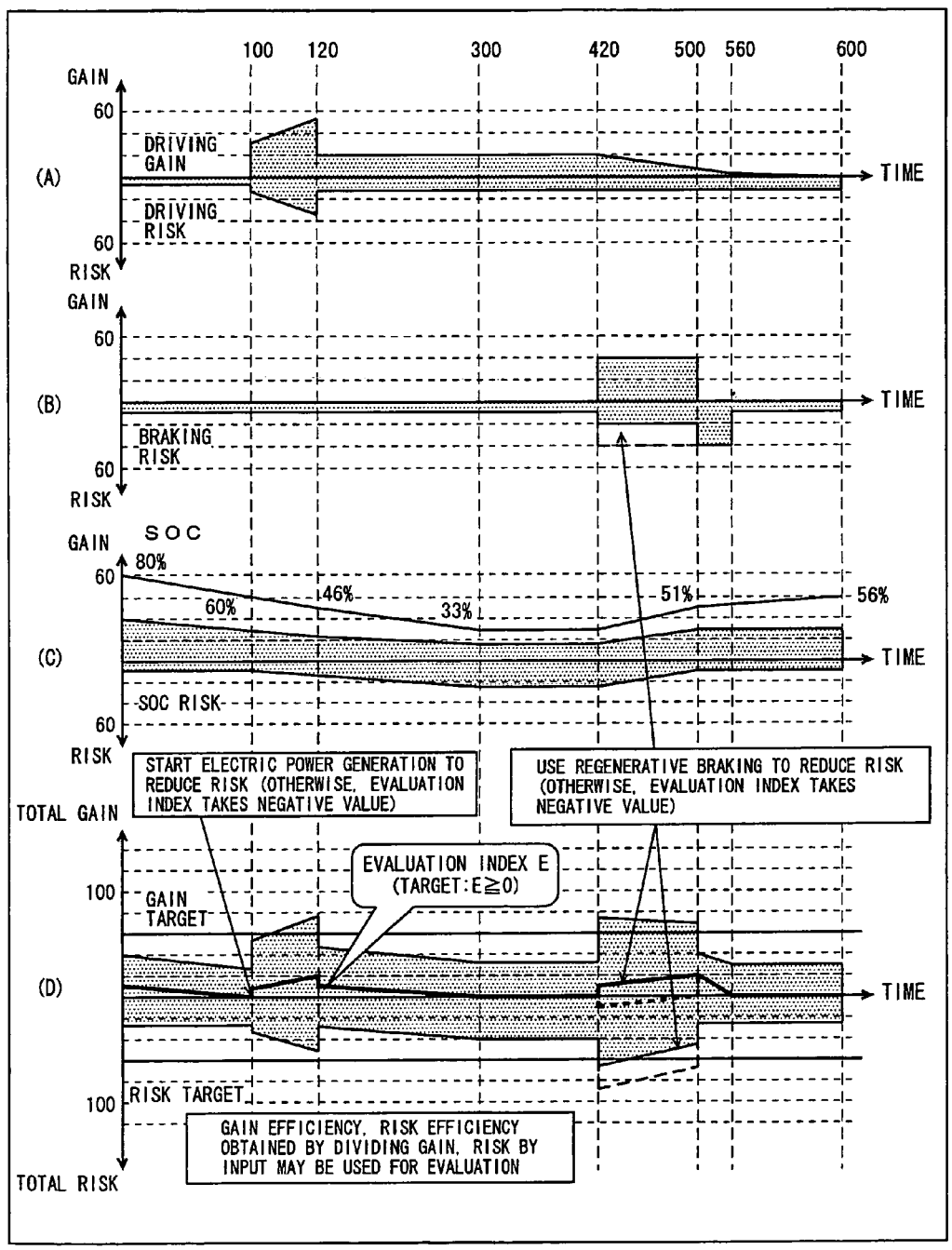

As shown in FIG. 21(D), when the total risk becomes large, the system starts electric power generation to reduce the risk, since otherwise evaluation index E would become less than zero. Control is carried out to realize E≧0 as a target of evaluation index E. The risk is reduced such that evaluation index E maintains the target state. For example, when the braking risk increases as shown in FIG. 21(B), the total risk increases as well, so that the evaluation index takes a negative value. Thus, in order to reduce the braking risk, regenerative braking is used to cause the braking risk to decrease from the state shown by the dotted line to the state shown by the solid line. Accordingly, as shown in FIG. 21(D), the total risk can be modified from the state as represented by the dotted line to the state as represented by the solid line, to cause evaluation index E to move to a positive state. That is, it is possible to avoid the situation where evaluation index E would take a negative value in absence of the regenerative braking.

It is noted that the evaluation may be conducted using, instead of the gain and risk themselves, gain efficiency and risk efficiency obtained by dividing the gain and risk by input values.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control system for a movable body, comprising a detection unit detecting at least one of information related to state quantity and information related to operation quantity, a control unit generating, based on the detected information, control information to be applied to an execution unit achieving a target, and the execution unit executing at least one of electrical operation and mechanical operation based on said control information, comprising:
a reliability detection unit detecting information related to reliability of said system by processing, for said system, at least state quantity in line with said target and state quantity contrary to said target in a same probability dimension allowing comparison therebetween; and
a modification unit modifying at least one of said target and said control information based on said information related to reliability detected.

2. The control system according to claim 1, wherein said reliability detection unit detects said information related to reliability based on a probability that deviation from the target in said execution unit is not less than a predetermined value.

3. The control system according to claim 1, wherein said reliability detection unit detects said information related to reliability based on a probability that, as a result of execution of said operation by said execution unit, deviation of an actual output from an intended output corresponding to said target is not less than a predetermined value.

4. The control system according to claim 1, wherein said reliability detection unit detects said information related to reliability based on a probability that, as a result of execution of said operation by said execution unit, deviation of actual efficiency from intended efficiency corresponding to said target is not less than a predetermined value.

5. The control system according to claim 1, wherein said information related to reliability is information represented by a probability that state quantity of a component constituting said movable body changes.

6. The control system according to claim 1, wherein said information related to reliability is information represented by a probability of occurrence of abnormality in at least one of an input-related component, a control-related component, an output-related component, and a communication-related component, the components constituting said movable body.

7. The control system according to claim 1, wherein said information related to reliability is information represented by a probability of occurrence of abnormality attributable to at least one of a detection error of a sensor detecting said state quantity as an input-related component, an operation error of an actuator as an output-related component, response of an actuator as the output-related component, response of a communication-related component, and an error of said target, the components constituting said movable body.

8. The control system according to claim 1, wherein said modification unit modifies at least one of said target and said control information based on deviation from said target when said reliability is within a target range.

9. The control system according to claim 8, wherein said modification unit modifies said control information, when the deviation from said target is within a predetermined range, by modifying input/output characteristics for generating said control information.

10. The control system according to claim 8, wherein said modification unit modifies said target, when the deviation from said target is not less than a predetermined value, determining that said target is excessive.

11. A control system controlling a vehicle as a movable body to realize a required target in the vehicle, comprising:
a detection unit detecting state quantity of the vehicle in line with target characteristic as gain state quantity;
a detection unit detecting state quantity of the vehicle contrary to the target characteristic as risk state quantity;
a calculation unit calculating a probability of occurrence of deviation of each of said detected state quantities from a corresponding target; and
a modification unit modifying said target in a direction leading to further improvement of performance when the probability calculated for said risk state quantity is within a predetermined range and the probability calculated for said gain state quantity is within a predetermined range.

12. A control system controlling a vehicle as a movable body to realize a required target in the vehicle, comprising:
- a detection unit detecting state quantity of the vehicle in line with target characteristic as gain state quantity;
- a detection unit detecting state quantity of the vehicle contrary to the target characteristic as risk state quantity;
- a calculation unit calculating a probability of occurrence of deviation of each of said detected state quantities from a corresponding target; and
- a modification unit modifying input/output characteristics of an actuator related to said gain state quantity, when the probability calculated for said risk state quantity is within a predetermined range and the probability calculated for said gain state quantity is out of a predetermined range.

13. A control system controlling a vehicle as a movable body to realize a required target in the vehicle, comprising:
- a detection unit detecting state quantity of the vehicle in line with target characteristic as gain state quantity;
- a detection unit detecting state quantity of the vehicle contrary to the target characteristic as risk state quantity;
- a calculation unit calculating a probability of occurrence of deviation of each of said detected state quantities from a corresponding target; and
- an execution unit executing a risk aversion process when the probability calculated for said risk state quantity is out of a predetermined range.

14. A control system controlling at least one of energy efficiency, driving performance, exhaust gas performance and braking performance in a vehicle as a movable body, comprising:
- a detection unit detecting at least one of vehicle speed, driving efficiency, exhaust gas purification performance, braking force and braking efficiency as gain state quantity;
- a detection unit detecting at least one of risk of reduction of the vehicle speed, risk of reduction of the driving efficiency, risk of degradation of the exhaust gas purification performance, risk of reduction of the braking force, and risk of reduction of the braking efficiency as risk state quantity;
- a calculation unit calculating a probability of occurrence of deviation of each of said detected state quantities from a corresponding target; and
- a modification unit modifying said target in a direction leading to further improvement of performance when the probability calculated for said risk state quantity is within a predetermined range and the probability calculated for said gain state quantity is within a predetermined range.

15. A control system controlling at least one of energy efficiency, driving performance, exhaust gas performance and braking performance in a vehicle as a movable body, comprising:
- a detection unit detecting at least one of vehicle speed, driving efficiency, exhaust gas purification performance, braking force and braking efficiency as gain state quantity;
- a detection unit detecting at least one of risk of reduction of the vehicle speed, risk of reduction of the driving efficiency, risk of degradation of the exhaust gas purification performance, risk of reduction of the braking force, and risk of reduction of the braking efficiency as risk state quantity;
- a calculation unit calculating a probability of occurrence of deviation of each of said detected state quantities from a corresponding target; and
- a modification unit modifying input/output characteristics of an actuator related to said energy efficiency, exhaust gas performance and braking performance, when the probability calculated for said risk state quantity is within a predetermined range and the probability calculated for said gain state quantity is out of a predetermined range.

16. A control system controlling at least one of energy efficiency, driving performance, exhaust gas performance and braking performance in a vehicle as a movable body, comprising:
- a detection unit detecting at least one of vehicle speed, driving efficiency, exhaust gas purification performance, braking force and braking efficiency as gain state quantity;
- a detection unit detecting at least one of risk of reduction of the vehicle speed, risk of reduction of the driving efficiency, risk of degradation of the exhaust gas purification performance, risk of reduction of the braking force, and risk of reduction of the braking efficiency as risk state quantity;
- a calculation unit calculating a probability of occurrence of deviation of each of said detected state quantities from a corresponding target; and
- an execution unit executing a risk aversion process when the probability calculated for said risk state quantity is out of a predetermined range.

17. A control system for a movable body, comprising detection means for detecting at least one of information related to state quantity and information related to operation quantity, control means for generating, based on the detected information, control information to be applied to execution means for achieving a target, and the execution means for executing at least one of electrical operation and mechanical operation based on said control information, comprising:
- reliability detection means for detecting information related to reliability of said system by processing, for said system, at least state quantity in line with said target and state quantity contrary to said target in a same probability dimension allowing comparison therebetween; and modification means for modifying at least one of said target and said control information based on said information related to reliability detected.

18. The control system according to claim 17, wherein said reliability detection means includes means for detecting said information related to reliability based on a probability that deviation from the target in said execution means is not less than a predetermined value.

19. The control system according to claim 17, wherein said reliability detection means includes means for detecting said information related to reliability based on a probability that, as a result of execution of said operation by said execution means, deviation of an actual output from an intended output corresponding to said target is not less than a predetermined value.

20. The control system according to claim 17, wherein said reliability detection means includes means for detecting said information related to reliability based on a probability that, as a result of execution of said operation by said execution means, deviation of actual efficiency from intended efficiency corresponding to said target is not less than a predetermined value.

21. The control system according to claim 17, wherein said information related to reliability is information represented by a probability that state quantity of a component constituting said movable body changes.

22. The control system according to claim 17, wherein said information related to reliability is information represented by a probability of occurrence of abnormality in at least one of an input-related component, a control-related component, an output-related component, and a communication-related component, the components constituting said movable body.

23. The control system according to claim 17, wherein said information related to reliability is information represented by a probability of occurrence of abnormality attributable to at least one of a detection error of a sensor detecting said state quantity as an input-related component, an operation error of an actuator as an output-related component, response of an actuator as the output-related component, response of a communication-related component, and an error of said target, the components constituting said movable body.

24. The control system according to claim 17, wherein said modification means includes means for modifying at least one of said target and said control information based on deviation from said target when said reliability is within a target range.

25. The control system according to claim 24, wherein said modification means includes means for modifying said control information, when the deviation from said target is within a predetermined range, by modifying input/output characteristics for generating said control information.

26. The control system according to claim 24, wherein said modification means includes means for modifying said target, when the deviation from said target is not less than a predetermined value, determining that said target is excessive.

27. A control system controlling a vehicle as a movable body to realize a required target in the vehicle, comprising:
means for detecting state quantity of the vehicle in line with target characteristic as gain state quantity;
means for detecting state quantity of the vehicle contrary to the target characteristic as risk state quantity;
means for calculating a probability of occurrence of deviation of each of said detected state quantities from a corresponding target; and
means for modifying said target in a direction leading to further improvement of performance when the probability calculated for said risk state quantity is within a predetermined range and the probability calculated for said gain state quantity is within a predetermined range.

28. A control system controlling a vehicle as a movable body to realize a required target in the vehicle, comprising:
means for detecting state quantity of the vehicle in line with target characteristic as gain state quantity;
means for detecting state quantity of the vehicle contrary to the target characteristic as risk state quantity;
means for calculating a probability of occurrence of deviation of each of said detected state quantities from a corresponding target; and
means for modifying input/output characteristics of an actuator related to said gain state quantity, when the probability calculated for said risk state quantity is within a predetermined range and the probability calculated for said gain state quantity is out of a predetermined range.

29. A control system controlling a vehicle as a movable body to realize a required target in the vehicle, comprising:
means for detecting state quantity of the vehicle in line with target characteristic as gain state quantity;
means for detecting state quantity of the vehicle contrary to the target characteristic as risk state quantity;
means for calculating a probability of occurrence of deviation of each of said detected state quantities from a corresponding target; and
means for executing a risk aversion process when the probability calculated for said risk state quantity is out of a predetermined range.

30. A control system controlling at least one of energy efficiency, driving performance, exhaust gas performance and braking performance in a vehicle as a movable body, comprising:
means for detecting at least one of vehicle speed, driving efficiency, exhaust gas purification performance, braking force and braking efficiency as gain state quantity;
means for detecting at least one of risk of reduction of the vehicle speed, risk of reduction of the driving efficiency, risk of degradation of the exhaust gas purification performance, risk of reduction of the braking force, and risk of reduction of the braking efficiency as risk state quantity;
means for calculating a probability of occurrence of deviation of each of said detected state quantities from a corresponding target; and
means for modifying said target in a direction leading to further improvement of performance when the probability calculated for said risk state quantity is within a predetermined range and the probability calculated for said gain state quantity is within a predetermined range.

31. A control system controlling at least one of energy efficiency, driving performance, exhaust gas performance and braking performance in a vehicle as a movable body, comprising:
means for detecting at least one of vehicle speed, driving efficiency, exhaust gas purification performance, braking force and braking efficiency as gain state quantity;
means for detecting at least one of risk of reduction of the vehicle speed, risk of reduction of the driving efficiency, risk of degradation of the exhaust gas purification performance, risk of reduction of the braking force, and risk of reduction of the braking efficiency as risk state quantity;
means for calculating a probability of occurrence of deviation of each of said detected state quantities from a corresponding target; and
means for modifying input/output characteristics of an actuator related to said energy efficiency, exhaust gas performance and braking performance, when the probability calculated for said risk state quantity is within a predetermined range and the probability calculated for said gain state quantity is out of a predetermined range.

32. A control system controlling at least one of energy efficiency, driving performance, exhaust gas performance and braking performance in a vehicle as a movable body, comprising:
means for detecting at least one of vehicle speed, driving efficiency, exhaust gas purification performance, braking force and braking efficiency as gain state quantity;
means for detecting at least one of risk of reduction of the vehicle speed, risk of reduction of the driving efficiency, risk of degradation of the exhaust gas purification performance, risk of reduction of the braking force, and risk of reduction of the braking efficiency as risk state quantity;
calculation means for calculating a probability of occurrence of deviation of each of said detected state quantities from a corresponding target; and
means for executing a risk aversion process when the probability calculated for said risk state quantity is out of a predetermined range.

* * * * *